United States Patent
Nyati et al.

(10) Patent No.: US 11,609,838 B2
(45) Date of Patent: Mar. 21, 2023

(54) SYSTEM TO TRACK AND MEASURE MACHINE LEARNING MODEL EFFICACY

(71) Applicant: PayPal, Inc., San Jose, CA (US)

(72) Inventors: Lokesh Nyati, Pune (IN); Jonathan Doering, London (GB); Sruthi Yapalapalli, Hyderabad (IN); Sriharsha Vogeti, Hyderabad (IN)

(73) Assignee: PayPal, Inc., San Jose, CA (US)

( * ) Notice: Subject to any disclaimer, the term of this patent is extended or adjusted under 35 U.S.C. 154(b) by 258 days.

(21) Appl. No.: 17/024,133

(22) Filed: Sep. 17, 2020

(65) Prior Publication Data

US 2022/0083445 A1   Mar. 17, 2022

(51) Int. Cl.
  *G06F 11/34*   (2006.01)
  *G06F 11/32*   (2006.01)
  *G06F 11/30*   (2006.01)
  *G06N 20/00*   (2019.01)

(52) U.S. Cl.
  CPC ........ *G06F 11/3452* (2013.01); *G06F 11/302* (2013.01); *G06F 11/323* (2013.01); *G06N 20/00* (2019.01)

(58) Field of Classification Search
  CPC .. G06F 11/0754; G06F 11/302; G06F 11/323; G06F 11/3452; G06F 11/3612; G06F 11/3616; G06F 2201/81; G06F 2201/865; G06N 20/00
  USPC ........................................................ 702/179
  See application file for complete search history.

(56) References Cited

U.S. PATENT DOCUMENTS

| | | | |
|---|---|---|---|
| 10,505,825 B1 * | 12/2019 | Bettaiah | G06F 16/24578 |
| 10,740,692 B2 * | 8/2020 | Mann | G06F 16/35 |
| 2018/0174067 A1 * | 6/2018 | Spiro | G06N 20/00 |
| 2018/0174086 A1 * | 6/2018 | Spiro | G06Q 10/06313 |

* cited by examiner

*Primary Examiner* — John H Le
(74) *Attorney, Agent, or Firm* — Greenberg Traurig, LLP

(57) ABSTRACT

Systems and/or techniques for facilitating online-monitoring of machine learning models are provided. In various embodiments, a system can receive monitoring settings associated with a machine learning model to be monitored. In various cases, the monitoring settings can identify a first set of data features that are generated as output by the machine learning model. In various cases, the monitoring settings can identify a second set of data features that are received as input by the machine learning model. In various aspects, the system can compute a first set of statistical metrics based on the first set of data features. In various cases, the first set of statistical metrics can characterize a performance quality of the machine learning model. In various instances, the system can compute a second set of statistical metrics based on the second set of data features. In various cases, the second set of statistical metrics can characterize trends or distributions of input data associated with the machine learning model. In various aspects, the system can store the first set of statistical metrics and the second set of statistical metrics in a data warehouse that is accessible to an operator. In various embodiments, the system can render the first set of statistical metrics and the second set of statistical metrics on an electronic interface, such that the first set of statistical metrics and the second set of statistical metrics are viewable to the operator.

17 Claims, 12 Drawing Sheets

SYSTEM TO TRACK AND MEASURE MACHINE LEARNING MODEL EFFICACY

TECHNICAL FIELD

The subject disclosure relates generally to machine learning models, and more specifically to computerized systems that perform real-time and/or online monitoring, tracking, and/or measuring of machine learning model performance.

BACKGROUND

Conventionally, the performance of a machine learning model is gauged by offline analytics systems. Such offline analytics systems are not integrated with the machine learning model and thus do not provide operators/analysts with access to real-time performance metrics that are generated while the machine learning model is deployed in the field. Accordingly, operators/analysts are often forced to take educated guesses on the basis of potentially stale/outdated performance metrics when defining/refining filter thresholds, decision conditions, and/or other parameters of the machine learning model. This can ultimately result in suboptimal operation of the machine learning model.

Systems and/or techniques that can ameliorate one or more of these issues are desirable.

DETAILED DESCRIPTION

Figure 1:
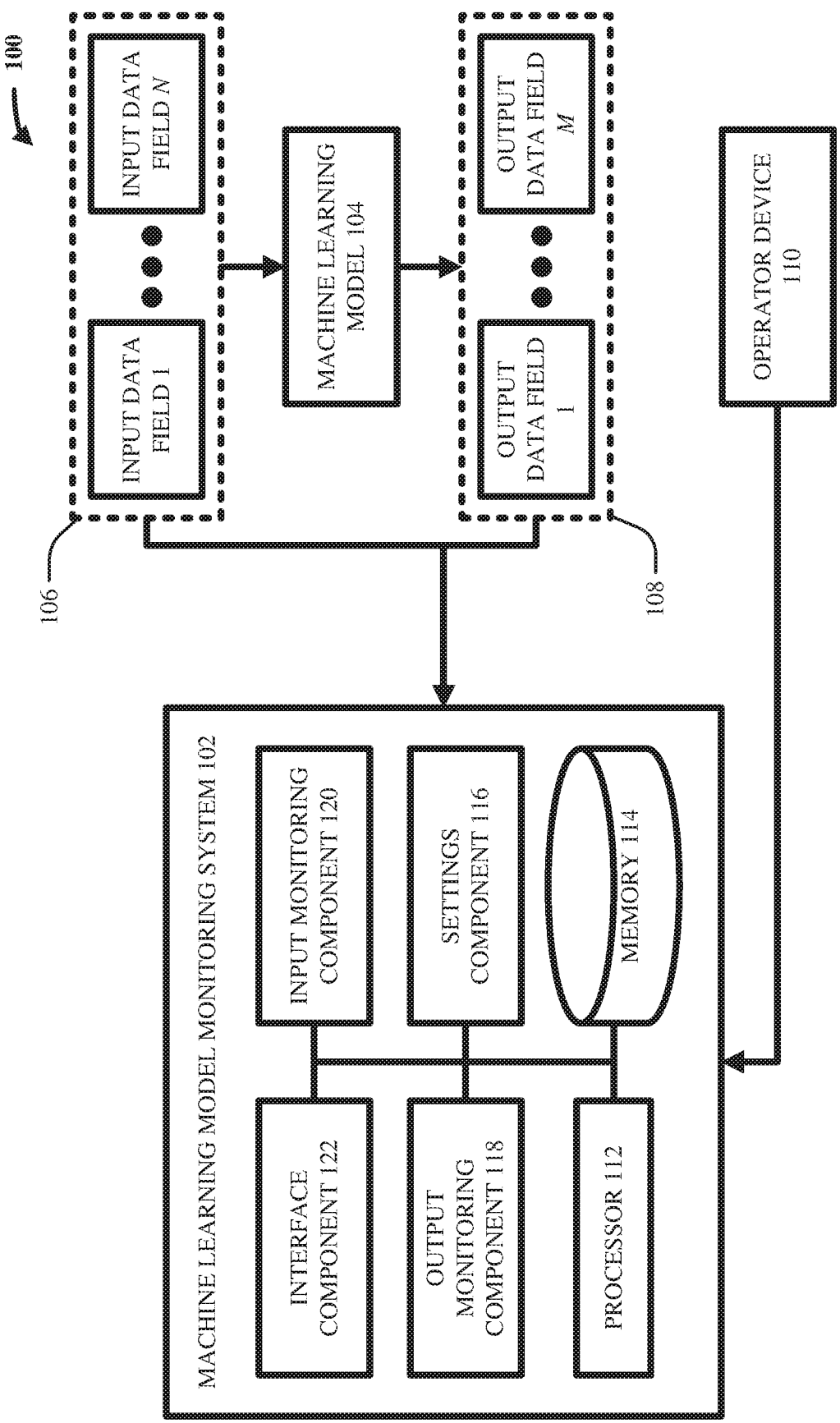
FIG. 1 illustrates a high-level block diagram of an example, non-limiting system that facilitates real-time and/or online monitoring, tracking, and/or measuring of machine learning model performance in accordance with one or more embodiments described herein.

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A machine learning model can be any suitable computer-implemented artificial intelligence algorithm that can be trained (e.g., via supervised learning, unsupervised learning, and/or reinforcement learning) to receive input data and to generate output data based on the received input data (e.g., neural network, linear regression, logistic regression, decision tree, support vector machine, naïve Bayes, and/or so on). In various aspects, the input data can have any suitable format and/or dimensionality (e.g., character strings, scalars, vectors, matrices, tensors, images, sound recordings, and/or so on). Likewise, the output data can have any suitable format and/or dimensionality (e.g., character strings, scalars, vectors, matrices, tensors, images, sound recordings, and/or so on). In various aspects, a machine learning model can be implemented to generate any suitable determinations and/or predictions in any suitable operational environment (e.g., can be implemented in a payment processing context, where the model receives payment data, transaction data, and/or customer data and determines/predicts whether given transactions are fraudulent, whether given customers are likely to default, and/or any other suitable financial determinations/predictions; can be implemented in a medical context, where the model receives medical images and/or patient data and generates diagnoses, prognoses, segmentations, and/or any other suitable medical determinations/predictions; and/or so on).

In various embodiments, it can be desired to monitor, track, and/or measure the performance and/or efficacy of a machine learning model (as used herein, the terms performance and efficacy are interchangeable). As recognized by the inventors of various embodiments of the subject innovation, conventional systems and/or techniques for monitoring, tracking, and/or measuring the performance of a machine learning model operate in an offline (e.g., disconnected) fashion rather than in an online (e.g., connected) fashion. That is, such conventional systems and/or techniques are not integrated with and/or coupled to the machine learning model while the machine learning model is operating and/or deployed in the field. Because such conventional systems and/or techniques operate in an offline fashion, such conventional systems and/or techniques cannot monitor, track, and/or measure the performance of the machine learning model in real-time. Accordingly, an operator/analyst of the machine learning model is deprived of real-time metrics characterizing the performance of the machine learning model. This can force the operator/analyst to make heuristic guesses rather than up-to-date, data-driven choices when defining/refining filter thresholds, decision conditions, and/or other parameters of the machine learning model. This can ultimately result in sub-optimal operation of the machine learning model.

Moreover, as recognized by the inventors of various embodiments of the subject innovation, such conventional systems and/or techniques calculate performance metrics that are based only on the output of the machine learning model. In other words, when quantifying the performance of the machine learning model, such conventional systems and/or techniques consider only the output data generated by the machine learning model and do not take into account the input data received by the machine learning model. However, as recognized by the inventors of various embodiments of the subject innovation, the performance of the machine learning model can depend upon the statistical trends and/or statistical distributions of the input data. Specifically, the machine learning model can be expected to perform well (e.g., with an acceptably high degree of accuracy and/or precision) when the input data that the machine learning model receives during operation in the field resembles and/or is sufficiently similar to (e.g., within a threshold margin of) the training data on which the machine learning model was trained. If the input data does not resemble and/or is not sufficiently similar to (e.g., is outside the threshold margin of) the training data, the machine learning model can exhibit deteriorated performance (e.g., can experience lower accuracy and/or precision). Conventional systems and/or techniques for monitoring machine learning model performance simply do not monitor input features at all.

Various embodiments of the subject innovation can address one or more of these technical problems. One or more embodiments described herein include systems, computer-implemented methods, apparatus, and/or computer program products that can facilitate real-time and/or online monitoring, tracking, and/or measuring of machine learning model performance. In other words, various embodiments of the subject innovation can be considered as a computerized tool that can be integrated with a machine learning model, that can compute, in real-time, metrics that describe/indicate the performance of the machine learning model, and that can present, in real-time, such metrics to an operator of the machine learning model. Such a computerized tool can, in some cases, enable the operator to make up-to-date and data-driven choices when modifying parameters of the machine learning model. Moreover, various embodiments of the subject innovation can compute metrics that describe/indicate the performance of the machine learning model not only on the basis of output data generated by the machine learning model, but also on the basis of input data received by the machine learning model. In this way, various embodiments of the subject innovation can determine whether input data received by the machine learning model is too dissimilar from training data on which the machine learning model was trained. Accordingly, various embodiments of the subject innovation can provide an alert to the operator in real-time, thereby informing the operator that the statistical trends/distributions of the input data currently encountered by the machine learning model are sufficiently different (e.g., differ by more than a threshold margin) from the statistical trends/distributions of the training data on which the machine learning model was trained, such that retraining and/or revalidation of the machine learning model is warranted. In other words, various embodiments of the subject innovation can recommend and/or suggest to the operator that retraining and/or revalidation of the machine learning model is appropriate since the input data has become too different from the training data on which the machine learning model was trained.

Overall, various embodiments of the subject innovation can be considered as a computer-implemented diagnostic tool that can be leveraged by an operator, analyst, and/or software engineer to help analyze and/or maintain a deployed machine learning model.

Suppose that a machine learning model is deployed in the field. In such case, the machine learning model can receive a set of input data features (e.g., one or more input attributes representing data to be analyzed) and can generate a set of output data features (e.g., one or more output scores representing determinations/predictions) based on the set of input data features. Moreover, suppose that an operator (e.g., analyst, software engineer) of the machine learning model desires to monitor, track, and/or measure the performance of the machine learning model in real-time. Various embodiments of the subject innovation can facilitate such monitoring, tracking, and/or measuring. Specifically, various embodiments of the subject innovation can be a computerized monitoring system that includes a settings component, an output monitoring component, an input monitoring component, and an interface component.

In various embodiments, the settings component can receive settings information from the operator (e.g., from a device used by the operator, such as a desktop computer, laptop computer, smart phone, tablet, and/or so on). In various aspects, the settings information can identify and/or indicate one or more of the output data features to monitor, one or more of the input data features to monitor, a monitoring timeframe, and/or a monitoring frequency.

In various aspects, the one or more output data features to monitor can represent which of the set of output data features the operator desires to be monitored by the computerized monitoring system. In some cases, all of the set of output data features can be monitored. In other cases, fewer than all of the set of output data features can be monitored. In other words, the operator can select which individual output data features from the set of output data features will be monitored by the computerized monitoring system. In various cases, these can be referred to as the indicated output data features. Similarly, in various aspects, the one or more input data features to monitor can represent which of the set of input data features the operator desires to be monitored by the computerized monitoring system. In some cases, all of the set of input data features can be monitored. In other cases, fewer than all of the set of input data features can be monitored. In other words, the operator can select which individual input data features from the set of input data features will be monitored by the computerized monitoring system. In various cases, these can be referred to as the indicated input data features.

In various instances, the monitoring timeframe can be any suitable time range and/or time period over which to monitor, analyze, and/or evaluate the indicated output data features and/or the indicated input data features. In other words, the indicated output data features that were/are generated by the machine learning model during the monitoring timeframe and the indicated input data features that were/are received by the machine learning model during the monitoring timeframe can be analyzed so as to evaluate the performance of the machine learning model. For instance, the monitoring timeframe can be the previous 24 hours. In such case, this can cause the computerized monitoring system to evaluate/monitor the indicated output data features that were/are generated by the machine learning model between the current time and 24 hours prior to the current time, and to evaluate/monitor the indicated input data features that were/are received by the machine learning model between the current time and 24 hours prior to the current time. In various aspects, any other suitable monitoring timeframe can be implemented (e.g., 6-hour monitoring timeframe, 12-hour monitoring timeframe, 7-day monitoring timeframe, 30-day monitoring timeframe, 90-day monitoring timeframe, 6-month monitoring timeframe, 1-year monitoring timeframe, and/or so on).

In various aspects, the monitoring frequency can be any suitable frequency at which the computerized monitoring system is to perform an evaluation of the indicated output data features and/or the indicated input data features over the monitoring timeframe. For instance, the monitoring frequency can be once per 6 hours. In such case, this can cause the computerized monitoring system to evaluate/monitor the indicated output data features and the indicated input data features once every 6 hours. To continue this example, suppose that the monitoring timeframe is 24 hours and that the current time is T. In various aspects, the computerized monitoring system can perform an evaluation of the machine learning model at time T by evaluating/analyzing the indicated output data features that were generated by the machine learning model between the time T and the time T−24 (e.g., representing a 24 hour monitoring timeframe) and by evaluating/analyzing the indicated input data features that were received by the machine learning model between the time T and the time T−24 (e.g., representing a 24 hour monitoring timeframe). Because the monitoring frequency is once every 6 hours, the computerized monitoring system can then wait 6 hours to perform the next evaluation. Accordingly, the computerized monitoring system can perform a new evaluation at the new current time T+6 (e.g., six hours after the previous current time T) by evaluating/analyzing the indicated output data features that were generated by the machine learning model between the time T+6 and the time T−18 (e.g., representing a 24 hour monitoring timeframe) and by evaluating/analyzing the indicated input data features that were received by the machine learning model between the time T+6 and the time T−18 (e.g., representing a 24 hour monitoring timeframe). In various aspects, any other suitable monitoring frequency can be implemented (e.g., once every hour, once every 12 hours, once every 24 hours, once every 7 days, once every 30 days, once every 90 days, once every 6 months, once every year, and/or so on).

In various embodiments, the output monitoring component can monitor, track, evaluate, and/or analyze the indicated output data features that were/are generated by the machine learning model during the monitoring timeframe. In various aspects, the output monitoring component can receive and/or have access to the full set of output data features generated by the machine learning model (e.g., the full set of values of the output data features can be stored in any suitable centralized and/or distributed database and/or data structure that is accessible to the output monitoring component), and can compute and/or calculate first metrics based on the indicated output data features that were generated by the machine learning model over the monitoring timeframe. In various instances, the first metrics can be any suitable mathematical and/or statistical metrics that measure and/or capture the performance of the machine learning model (e.g., precision scores of the model over the monitoring timeframe, accuracy scores of the model over the monitoring timeframe, recall scores of the model over the monitoring timeframe, Dice scores of the model over the monitoring timeframe, computation times of the model over the monitoring timeframe, and/or so on). In various aspects, the output monitoring component can receive and/or have access to feedback information that is associated with the machine learning model (e.g., feedback provided by the operator can be stored in any suitable centralized and/or distributed database and/or data structure that is accessible to the output monitoring component), and can compute and/or calculate the first metrics based on such feedback (e.g., by comparing the outputs generated by the machine learning model with the ground truths represented by the feedback, precision scores, accuracy scores, recall scores, Dice scores, receiver operating characteristic (ROC) curves, and/or so on can be computed). In various cases, the output monitoring component can identify anomalous and/or irregular output behavior by comparing the computed first metrics to first predetermined thresholds that define appropriate and/or satisfactory performance of the machine learning model. If the computed first metrics do not satisfy the first predetermined thresholds (e.g., exceed maximum thresholds and/or fall below minimum thresholds), the output monitoring component can generate an alert indicating that anomalous behavior in the indicated output data features has been detected.

For example, suppose that the machine learning model is configured to predict whether a given transaction is likely to be successful, suppose that feedback is provided when electronic settlement of the given transaction either succeeds or fails, suppose that a recall score threshold of 0.9 defines satisfactory performance of the machine learning model, and suppose that the settings information indicates a monitoring timeframe of 36 hours and a monitoring frequency of 12 hours. In such case, the computerized monitoring system can compute, at a current time, a recall score for the machine learning model based on the transaction predictions that were generated by the machine learning model during the 36 hours preceding the current time and based on the feedback associated with those transaction predictions (e.g., can compute a recall score that describes the performance of the model between a current time T and the time T−36). Moreover, the computerized monitoring system can compare the computed recall score to the recall score threshold of 0.9 to identify anomalous output behavior of the machine learning model. If the computed recall score is below 0.9, the computerized monitoring system can determine that anomalous output behavior is detected and can generate a warning and/or alert to that effect (e.g., can transmit such warning and/or alert to the device used by the operator). The computerized monitoring system can then wait 12 hours per the 12-hour monitoring frequency, and can then compute, at a new current time, a new recall score based on the transaction predictions that were generated by the machine learning model during the 36 hours preceding the new current time and based on the feedback associated with those transaction predictions (e.g., can compute a new recall score based on model performance between a new current time T+12 and the time T−24).

In various embodiments, the input monitoring component can monitor, track, evaluate, and/or analyze the indicated input data features that were/are received by the machine learning model during the monitoring timeframe. In various aspects, the input monitoring component can receive and/or have access to the full set of input data features received by the machine learning model (e.g., the full set of values of the input data features can be stored in any suitable centralized and/or distributed database and/or data structure that is accessible to the input monitoring component), and can compute and/or calculate second metrics based on the indicated input data features that were received by the machine learning model over the monitoring timeframe. In various instances, the second metrics can be any suitable mathematical and/or statistical metrics that measure and/or capture trends, distributions, and/or behaviors of the indicated input data features over the monitoring timeframe (e.g., minimum input value for each indicated input feature over the monitoring timeframe, maximum input value for each indicated input feature over the monitoring timeframe, average input value for each indicated input feature over the monitoring timeframe, standard deviation of input values for each indicated input feature over the monitoring timeframe, kurtosis of input values for each indicated input feature over the monitoring timeframe, histogram of input values for each indicated input feature over the monitoring timeframe, cardinality of input values for each indicated input feature over the monitoring timeframe, and/or so on). In various cases, the input monitoring component can identify anomalous and/or irregular input behavior by comparing the computed second metrics to second predetermined thresholds that define appropriate and/or satisfactory input behaviors associated with the machine learning model. If the computed second metrics do not satisfy the second predetermined thresholds, the input monitoring component can generate an alert and/or warning indicating that anomalous behavior in the indicated input data features has been detected (e.g., an alert can be generated when the maximum input values are determined to be too high, when the minimum input values are determined to be too low, when the averages and/or standard deviations are determined to be too high/low, and/or so on). In various aspects, the second predetermined thresholds can be based on baseline metrics that measure and/or capture the trends, distributions, and/or behaviors of training data on which the machine learning model was trained. In such case, the input monitoring component can compare the second metrics (e.g., characterizing the input data received during the monitoring timeframe) to the baseline metrics (e.g., characterizing the training data used to configure the machine learning model) in order to detect anomalous input behavior (e.g., anomalous behavior can be detected when the second metrics differ from the baseline metrics by any suitable predetermined margin).

For example, suppose that the machine learning model is configured to predict whether a given transaction is likely to be successful on the basis of transaction amount, suppose that the machine learning model was trained on training transaction amount data having an average transaction amount value of X and a standard deviation of Y, and suppose that the settings information indicates a monitoring timeframe of 48 hours and a monitoring frequency of 6 hours. In such case, the computerized monitoring system can compute, at a current time, an average and a standard deviation of the transaction amounts that were received by the machine learning model during the 48 hours preceding the current time (e.g., can compute an average and a standard deviation based on the transaction amounts received between a current time T and the time T−48). Moreover, the computerized monitoring system can respectively compare the computed average and the computed standard deviation to the baseline average X and the baseline standard deviation Y to identify anomalous input behavior of the machine learning model. If the computed average differs from X by more than a predetermined margin (e.g., 0.5% difference, 1% difference, 2% difference, 5% difference) and/or if the computed standard deviation differs from Y by more than a predetermined margin (e.g., 0.5% difference, 1% difference, 2% difference, 5% difference), the computerized monitoring system can determine that anomalous input behavior is detected and can generate a warning and/or alert to that effect (e.g., can transmit such warning and/or alert to the device used by the operator). The computerized monitoring system can then wait 6 hours per the 6-hour monitoring frequency, and can then compute, at a new current time, a new average and a new standard deviation based on the transaction amounts that were received by the machine learning model during the 48 hours preceding the new current time (e.g., can compute a new average and a new standard deviation based on transaction amounts received between a new current time T+6 and the time T−42).

In various embodiments, the interface component can display and/or visually render the first metrics, the second metrics, and/or any generated alerts/warnings of anomalous behavior on an electronic display/screen that is viewable to the operator of the machine learning model (e.g., can transmit the first metrics, the second metrics, and/or any generated alerts/warnings to the device used by the operator). In this way, the computerized monitoring system can provide real-time output metrics and input metrics that characterize the performance of the machine learning model to the operator, thereby allowing the operator to make informed, data-driven choices when managing the machine learning model and/or modifying model parameters.

In various embodiments, the computerized monitoring system can further comprise a data warehouse component. In various aspects, the data warehouse component can be any suitable database and/or data structure that can store and/or maintain the computed first metrics, the computed second metrics, and/or the generated alerts/warnings (e.g., a distributed and/or centralized relational database, a distributed and/or centralized graph database, a distributed and/or centralized hybrid database, and/or so on). In various instances, the data warehouse component can be accessible to the operator of the machine learning model, such that the operator can select any suitable subsets of the computed first metrics, the computed second metrics, and/or the generated alerts/warnings to be displayed/rendered by the interface component.

Overall, various embodiments of the subject innovation can be considered as a computerized diagnostic tool that can monitor, track, and/or measure the performance of a machine learning model in real-time. Such a computerized diagnostic tool can enable an operator, analyst, and/or software engineer to more appropriately maintain and/or modify parameters of the machine learning model.

Various embodiments of the subject innovation can be employed to use hardware and/or software to solve problems that are highly technical in nature (e.g., to facilitate real-time and/or online monitoring, tracking, and/or measuring of the performance of a machine learning model), that are not abstract and that cannot be performed as a set of mental acts by a human. Further, some of the processes performed can be performed by a specialized computer (e.g., machine learning model, processor, memory, display interface) for carrying out defined tasks related to monitoring of machine learning model performance (e.g., receiving, by a device operatively coupled to a processor, monitoring settings associated with a machine learning model to be monitored, wherein the monitoring settings identify a first set of data features generated as output by the machine learning model and a second set of data features received as input by the machine learning model; computing, by the device, a first set of statistical metrics based on the first set of data features, such that the first set of statistical metrics characterize a performance quality of the machine learning model; computing, by the device, a second set of statistical metrics based on the second set of data features, such that the second set of statistical metrics characterize trends or distributions of input data associated with the machine learning model; storing, by the device, the first set of statistical metrics and the second set of statistical metrics in a data warehouse that is accessible to an operator; rendering, by the device, the first set of statistical metrics and the second set of statistical metrics on an electronic interface, such that the first set of statistical metrics and the second set of statistical metrics are viewable to the operator; and/or so on). Such defined tasks are not conventionally performed manually by humans. Indeed, neither the human mind nor a human with pen and paper can electronically receive monitoring settings that identify specific data generated and/or received by a machine learning model to be monitored/evaluated, compute statistical metrics based on the identified specific data, store the computed statistical metrics in a database, or visually render the computed statistical metrics on an electronic display. Instead, various embodiments of the subject innovation are inherently and inextricably tied to computer technology and cannot be implemented outside of a computing environment (e.g., trained machine learning models cannot exist outside of a computing environment, input data received by the machine learning model and/or output data generated by the machine learning model cannot exist outside of a computing environment, databases cannot exist outside of a computing environment, electronic interfaces/displays cannot exist outside of a computing environment, and/or so on).

In various instances, embodiments of the subject innovation can integrate into a practical application the disclosed teachings regarding real-time and/or online monitoring, tracking, and/or measuring of performance of a machine learning model. Indeed, in various embodiments, the disclosed teachings can provide a computerized diagnostic tool that can be leveraged by an operator, analyst, and/or software engineer to more optimally maintain and/or operate a deployed machine learning model. Specifically, the computerized diagnostic tool can be integrated with the machine learning model, and can receive settings from the operator (e.g., from a computing device that is used by the operator). In various cases, the settings can identify which output features of the machine learning model are desired to be monitored, which input features of the machine learning model are desired to be monitored, a monitoring timeframe, and a monitoring frequency. In various instances, the computerized diagnostic tool can retrieve and/or receive values of the identified output features that were generated by the machine learning model over/during the monitoring timeframe, and can compute/calculate various statistical metrics based on the values of the identified output features that were generated over/during the monitoring timeframe (e.g., precision scores, recall scores, Dice scores, computation times, and/or so on). In various instances, the computerized diagnostic tool can retrieve and/or receive values of the identified input features that were received by the machine learning model over/during the monitoring timeframe, and can compute/calculate various statistical metrics based on the values of the identified input features that were received over/during the monitoring timeframe (e.g., minimum values, maximum values, averages, standard deviations, kurtosis, histograms, and/or so on). In various aspects, the computerized diagnostic tool can identify and/or detect anomalous behaviors in the identified output features and/or the identified input features by comparing the computed statistical metrics with predetermined and/or predefined thresholds, and can generate electronic alerts/warnings accordingly. In various cases, the computerized diagnostic tool can store the computed statistical metrics and/or the generated electronic alerts/warnings in any suitable data structure that is accessible to the operator (e.g., that is electronically accessible to a device used by the operator), and/or can visually render/display the computed statistical metrics and/or the generated electronic alerts/warnings on an electronic display/screen that is viewable to the operator (e.g., can transmit the computed statistical metrics and/or the generated electronic alerts/warnings to the device used by the operator). Such a computerized diagnostic tool that can aid operators in maintaining/operating machine learning models is certainly a useful and/or practical application of computers.

Moreover, such a computerized diagnostic tool solves various technical problems in the field of machine learning model monitoring. Specifically, as mentioned above, conventional systems/techniques monitor a machine learning model only in an offline fashion and do not take into account at all the input data that is received by the machine learning model. In stark contrast, various embodiments of the subject innovation can operate in an online fashion (e.g., can be integrated with the machine learning model so as to monitor the model in real-time) and can compute statistical metrics that capture the trends, distributions, and/or behaviors of the input data that is received by the machine learning model. Thus, various embodiments of the subject innovation can generate electronic alerts/warnings in real-time when the input data becomes too dissimilar (e.g., different by any suitable margin of error) from the training data on which the machine learning model was trained. Conventional systems/techniques for monitoring a machine learning model simply do not take the input data into account, and thus cannot determine when the input data has become too dissimilar from the training data. For at least these reasons, various embodiments of the subject innovation constitute a concrete and tangible technical improvement in the field of machine learning model monitoring.

It should be appreciated that the herein figures are exemplary and non-limiting.

FIG. 1 illustrates a high-level block diagram of an example, non-limiting system 100 that can facilitate real-time and/or online monitoring, tracking, and/or measuring of machine learning model performance in accordance with one or more embodiments described herein. As shown, in various aspects, a machine learning model monitoring system 102 (hereafter referred to as "MLM monitoring system 102") can be integrated with a machine learning model 104, so as to monitor, track, and/or measure the performance of the machine learning model 104 in real-time and/or in an online (e.g., connected) fashion.

In various instances, the machine learning model 104 can be any suitable machine learning, deep learning, and/or artificial intelligence algorithm that is computer-implemented (e.g., neural network, linear regression, logistic regression, decision tree, support vector machine, naïve Bayes, and/or so on). In various aspects, the machine learning model 104 can be trained by any suitable training technique (e.g., supervised learning, unsupervised learning, reinforcement learning, and/or so on).

As shown, in various aspects, the machine learning model 104 can receive input data 106 and can generate output data 108 based on the input data 106. In various instances, the input data 106 can comprise any suitable number of input data fields and/or input data attributes (e.g., input data field 1 to input data field N, for any suitable integer N). For example, suppose that the machine learning model 104 is configured to operate in the payment processing context. In such case, a first input data field/attribute of the input data 106 can be a transaction amount data field/attribute (e.g., indicating monetary amount collated by transaction), a second input data field/attribute of the input data 106 can be a transaction time/date data field/attribute (e.g., indicating time/date collated by transaction), a third input data field/attribute of the input data 106 can be a product/service data field/attribute (e.g., indicating product/service collated by transaction), a fourth input data field/attribute of the input data 106 can be a merchant identity data field/attribute (e.g., indicating merchant identity collated by transaction), a fifth input data field/attribute of the input data 106 can be a customer identity data field/attribute (e.g., indicating customer identity collated by transaction), a sixth input data field/attribute of the input data 106 can be a customer information data field/attribute (e.g., indicating customer information such as transaction history, financial instrument, payment account, and/or so on collated by customer identity), and/or so on. In various aspects, values associated with an input data field/attribute can have any suitable format and/or dimensionality (e.g., can be character strings, scalars, vectors, matrices, tensors, images, sound recordings, and/or so on).

In various instances, the output data 108 can be considered as determinations, predictions, segmentations, labels, and/or classifications generated by the machine learning model 104 on the basis of the input data 106. In various aspects, the output data 108 can comprise any suitable number of output data fields (e.g., output data field 1 to output data field M, for any suitable integer M). For example, suppose that the machine learning model 104 is configured to operate in the payment processing context. In such case, a first output data field of the output data 108 can be a likelihood of success field (e.g., indicating a probability of successful settlement for a given transaction), a second output data field of the output data 108 can be a likelihood of fraud field (e.g., indicating a probability of attempted fraud for a given transaction), and/or so on. In various aspects, values of an output data field can have any suitable format and/or dimensionality (e.g., can be character strings, scalars, vectors, matrices, tensors, images, sound recordings, and/or so on).

As shown, in various instances, the machine learning model 104 can be in wired and/or wireless electronic communication with an operator device 110. In various aspects, the operator device 110 can be any suitable device (e.g., desktop computer, laptop computer, smart phone, tablet, and/or so on) with which and/or by which an operating entity can oversee, maintain, and/or modify parameters of the machine learning model 104, and/or with which and/or by which the operating entity can communicate/interact with the MLM monitoring system 102. In some cases, the operating entity can be an operator, an analyst and/or a software engineer, whether human or otherwise, that oversees the machine learning model 104, and the operating entity can interact with the machine learning model 104 and/or with the MLM monitoring system 102 via the operator device 110.

In various aspects, the MLM monitoring system 102 can have any suitable electronic access to the input data 106 (e.g., the input data 106 can be maintained in any suitable centralized and/or distributed database and/or data structure before being fed to the machine learning model 104). Similarly, in various aspects, the MLM monitoring system 102 can have any suitable electronic access to the output data 108 (e.g., the output data 108 can be maintained in any suitable centralized and/or distributed database and/or data structure after being produced by the machine learning model 104).

In various embodiments, the MLM monitoring system 102 can comprise a processor 112 (e.g., computer processing unit, microprocessor) and a computer-readable memory 114 that is operably and/or operatively and/or communicatively connected/coupled to the processor 112. The memory 114 can store computer-executable instructions which, upon execution by the processor 112, can cause the processor 112 and/or other components of the MLM monitoring system 102 (e.g., settings component 116, output monitoring component 118, input monitoring component 120, interface component 122) to perform one or more acts. In various embodiments, the memory 114 can store computer-executable components (e.g., settings component 116, output monitoring component 118, input monitoring component 120, interface component 122), and the processor 112 can execute the computer-executable components.

In various embodiments, the MLM monitoring system 102 can comprise a settings component 116. In various aspects, the settings component 116 can receive settings information from the operator device 110 (e.g., the operating entity can input such settings information to the operator device 110 via buttons, keyboards, keypads, voice command, touch screen, and/or any other suitable interface elements, and the operator device 110 can transmit the settings information to the settings component 116). In various instances, the settings information can specify details governing how the MLM monitoring system 102 is to monitor, track, and/or measure the performance of the machine learning model 104. In some cases, the settings information can indicate one or more output fields of the output data 108 to be monitored (e.g., referred to as indicated output fields). That is, depending upon the settings information specified by the operator device 110, the MLM monitoring system 102 can monitor all of the output data 108 (e.g., can monitor values in all M output data fields) and/or can monitor any suitable subset of the output data 108 (e.g., can monitor values in fewer than M output data fields). In some cases, the settings information can indicate one or more input fields of the input data 106 to be monitored (e.g., referred to as indicated input fields). That is, depending upon the settings information specified by the operator device 110, the MLM monitoring system 102 can monitor all of the input data 106 (e.g., can monitor values in all N input data fields) and/or can monitor any suitable subset of the input data 106 (e.g., can monitor values in fewer than N input data fields). In various aspects, the settings information can indicate a monitoring timeframe over which to monitor/evaluate the indicated output fields and/or the indicated input fields. For instance, the monitoring timeframe can be any suitable time period/range during which the machine learning model 104 was operational/deployed, and the indicated output field values that were generated by the machine learning model 104 during that time period/range and the indicated input field values that were received by the machine learning model 104 during that time period/range can be used to generate metrics that capture the performance of the machine learning model 104. In various aspects, the settings information can indicate a monitoring frequency that governs how frequently and/or how often the MLM monitoring system 102 monitors/evaluates the machine learning model 104.

In various embodiments, the MLM monitoring system 102 can comprise an output monitoring component 118. In various aspects, the output monitoring component 118 can have any suitable form of electronic access to the output data 108. In various instances, the output monitoring component 118 can receive and/or retrieve values of the indicated output fields from the output data 108 that were generated over the monitoring timeframe, and can generate first metrics based on the received/retrieved values of the indicated output fields. In some cases, the first metrics can be any suitable mathematical and/or statistical metrics that measure, capture, and/or indicate the performance of the machine learning model 104 over the monitoring timeframe (e.g., precision scores of the machine learning model 104 during the monitoring timeframe, recall scores of the machine learning model 104 during the monitoring timeframe, Dice scores of the machine learning model 104 during the monitoring timeframe, computation times of the machine learning model 104 during the monitoring timeframe, and/or so on). Although not explicitly shown in FIG. 1, the output monitoring component 118 can, in various embodiments, have any suitable form of electronic access to feedback data that is associated with the output data 108. In various instances, such feedback data can be provided by the operator device 110, can be stored in any suitable centralized and/or decentralized database, and/or can be provided by any other suitable feedback technique. In various aspects, the output data 108 can be considered as determinations, predictions, segmentations, labels, and/or classifications that are generated by the machine learning model 104, and the feedback data can be considered as ground truths associated with those determinations, predictions, segmentations, labels, and/or classifications (e.g., the feedback data can be considered as correct determinations, predictions, segmentations, labels, and/or classifications). In various instances, the output monitoring component 118 can leverage both the values of the indicated output fields and the feedback data associated with those values of the indicated output fields in order to generate precision scores, recall scores, Dice scores, ROC curves, and/or so on that quantify the performance of the machine learning model 104.

Once the output monitoring component 118 generates the first metrics, the output monitoring component 118 can, in various cases, compare the first metrics to first predetermined thresholds that define satisfactory performance of the machine learning model 104. In various cases, the first predetermined thresholds can be established by the operator device 110 (and/or by any other suitable technique). If the output monitoring component 118 determines that the first metrics do not satisfy the first predetermined thresholds (e.g., if the output monitoring component 118 determines that the computed precision scores, recall scores, and/or Dice scores are too low and/or that the computed computation times are too high), the output monitoring component 118 can generate an electronic alert/warning indicating that anomalous and/or irregular output behavior has been detected. For example, if the output monitoring component 118 computes a recall score for a particular output field that indicates the performance of the machine learning model 104 in that output field during the monitoring timeframe, the output monitoring component 118 can compare that computed recall score to a recall score threshold that defines a minimum acceptable recall score for the machine learning model 104 in that output field. If the output monitoring component 118 determines that the computed recall score is below the recall score threshold, the output monitoring component 118 can generate an electronic alert/warning to that effect.

In various embodiments, the MLM monitoring system 102 can comprise an input monitoring component 120. In various aspects, the input monitoring component 120 can have any suitable form of electronic access to the input data 106. In various instances, the input monitoring component 120 can receive and/or retrieve values of the indicated input fields from the input data 106 that were generated over the monitoring timeframe, and can generate second metrics based on the received/retrieved values of the indicated input fields. In some cases, the second metrics can be any suitable mathematical and/or statistical metrics that measure, capture, and/or indicate the trends, distributions, and/or behaviors of the input data 106 over the monitoring timeframe (e.g., maximum input values received by the machine learning model 104 during the monitoring timeframe, minimum input values received by the machine learning model 104 during the monitoring timeframe, average input values received by the machine learning model 104 during the monitoring timeframe, standard deviations of input values received by the machine learning model 104 during the monitoring timeframe, kurtosis of input values received by the machine learning model 104 during the monitoring timeframe, histograms of input values received by the machine learning model 104 during the monitoring timeframe, and/or so on).

Once the input monitoring component 120 generates the second metrics, the input monitoring component 120 can, in various cases, compare the second metrics to second predetermined thresholds that define satisfactory input data for the machine learning model 104. In various cases, the second predetermined thresholds can be established by the operator device 110 (and/or by any other suitable technique). Although not explicitly shown in FIG. 1, in some instances, the second predetermined threshold can be based on baseline metrics associated with training data on which the machine learning model 104 was trained (and/or based on testing/validation data on which the machine learning model 104 was tested/validated). In various cases, the baseline metrics can be any suitable mathematical and/or statistical metrics that measure, capture, and/or indicate the trends, distributions, and/or behaviors of the training data on which the machine learning model 104 was trained (e.g., maximum values of the training data, minimum values of the training data, average values of the training data, standard deviations of the training data, kurtosis of the training data, histograms of the training data, and/or so on). In other words, the baseline metrics can have the same format as the second metrics, so that comparison between the baseline metrics and the second metrics can be facilitated. If the input monitoring component 120 determines that the second metrics do not satisfy the second predetermined thresholds (e.g., if the input monitoring component 120 determines that the computed maximum values, minimum values, average values, standard deviations, and/or kurtosis values differ from the baseline maximum values, minimum values, average values, standard deviations, and/or kurtosis values by more than a predetermined margin), the input monitoring component 120 can generate an electronic alert/warning indicating that anomalous and/or irregular input behavior has been detected. For example, if the input monitoring component 120 computes an average value for a particular input field of the machine learning model 104 during the monitoring timeframe, the input monitoring component 120 can compare that computed average value to a threshold that defines the average value of the training data for that particular input field on which the machine learning model 104 was trained. If the input monitoring component 120 determines that the computed average value differs from the threshold by more than a predetermined margin (e.g., more than 1% difference, more than 5% difference, and/or so on), the input monitoring component 120 can generate an electronic alert/warning to that effect. In other words, the input monitoring component 120 can determine when the values of the indicated input data fields become too dissimilar from the values of the training data on which the machine learning model 104 was trained (and/or from the values of the testing/validation data on which the machine learning model 104 was tested/validated). Accordingly, the input monitoring component 120 can recommend and/or suggest that additional training (and/or additional testing and/or validation) is required, warranted, suggested, and/or recommended for the machine learning model 104.

In various embodiments, the MLM monitoring system 102 can comprise an interface component 122. In various aspects, the interface component 122 can display and/or visually render the first metrics, the second metrics, and/or any generated alerts/warnings on an electronic display, screen, and/or monitor. For instance, the interface component 122 can transmit an electronic instruction to the operator device 110, which can cause the operator device 110 to render on its own screen the first metrics, the second metrics, and/or any generated alerts/warnings. In this way, the first metrics, the second metrics, and/or the generated alerts/warnings can be communicated to the operator device 110 and thus to the operator entity.

Figure 2:
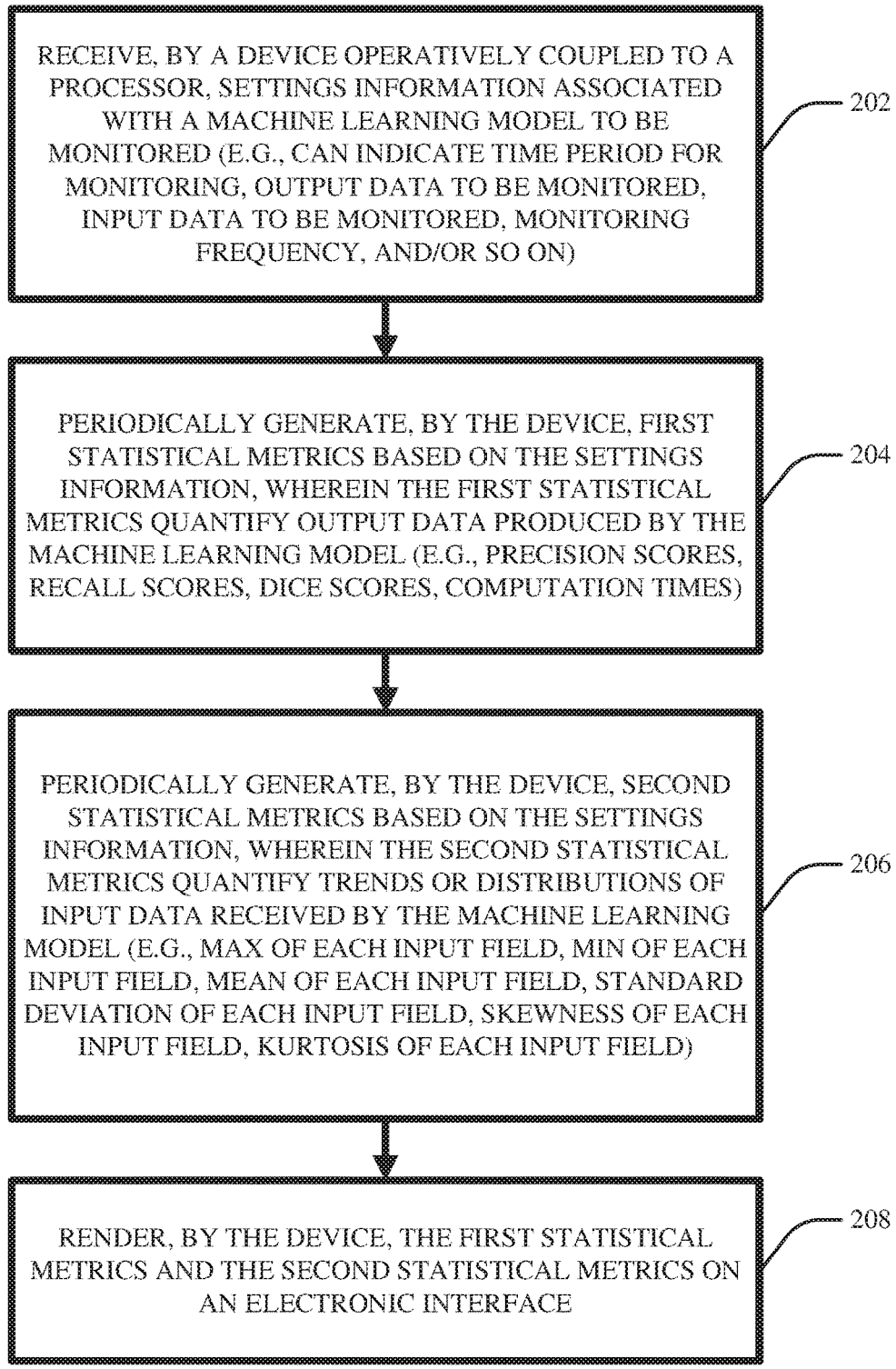
FIG. 2 illustrates a high-level flow diagram of an example, non-limiting computer-implemented method that facilitates real-time and/or online monitoring, tracking, and/or measuring of machine learning model performance in accordance with one or more embodiments described herein.

FIG. 2 illustrates a high-level flow diagram of an example, non-limiting computer-implemented method 200 that can facilitate real-time and/or online monitoring, tracking, and/or measuring of machine learning model performance in accordance with one or more embodiments described herein. In various aspects, the computer-implemented method 200 can be facilitated by the system 100.

In various embodiments, act 202 can include receiving, by a device operatively coupled to a processor (e.g., 116), settings information associated with a machine learning model to be monitored (e.g., 104). In various cases, the settings information can indicate a time period (e.g., monitoring timeframe) over which to monitor the machine learning model, can indicate which output data of the machine learning model to monitor over the indicated time period, can indicate which input data of the machine learning model to monitor over the indicated time period, can indicate a monitoring frequency, and/or so on.

In various instances, act 204 can include periodically generating, by the device (e.g., 118), first statistical metrics based on the settings information. In various aspects, the first statistical metrics can quantify output data produced by the machine learning model. For example, this can include generating precision scores, recall scores, Dice scores, computation times, ROC curves, and/or so on.

In various aspects, act 206 can include periodically generating, by the device (e.g., 120), second statistical metrics based on the settings information. In various cases, the second statistical metrics can quantify trends and/or distributions of input data received by the machine learning model. For example, this can include determining a maximum value of each input field of the machine learning model over a given time period, a minimum value of each input field of the machine learning model over a given time period, a mean of each input field of the machine learning model over a given time period, a standard deviation of each input field of the machine learning model over a given time period, skewness of each input field of the machine learning model over a given time period, a histogram of each input field of the machine learning model over a given time period, and/or so on.

In various instances, act 208 can include rendering, by the device (e.g., 122), the first statistical metrics and the second statistical metrics on an electronic interface.

Figure 3:
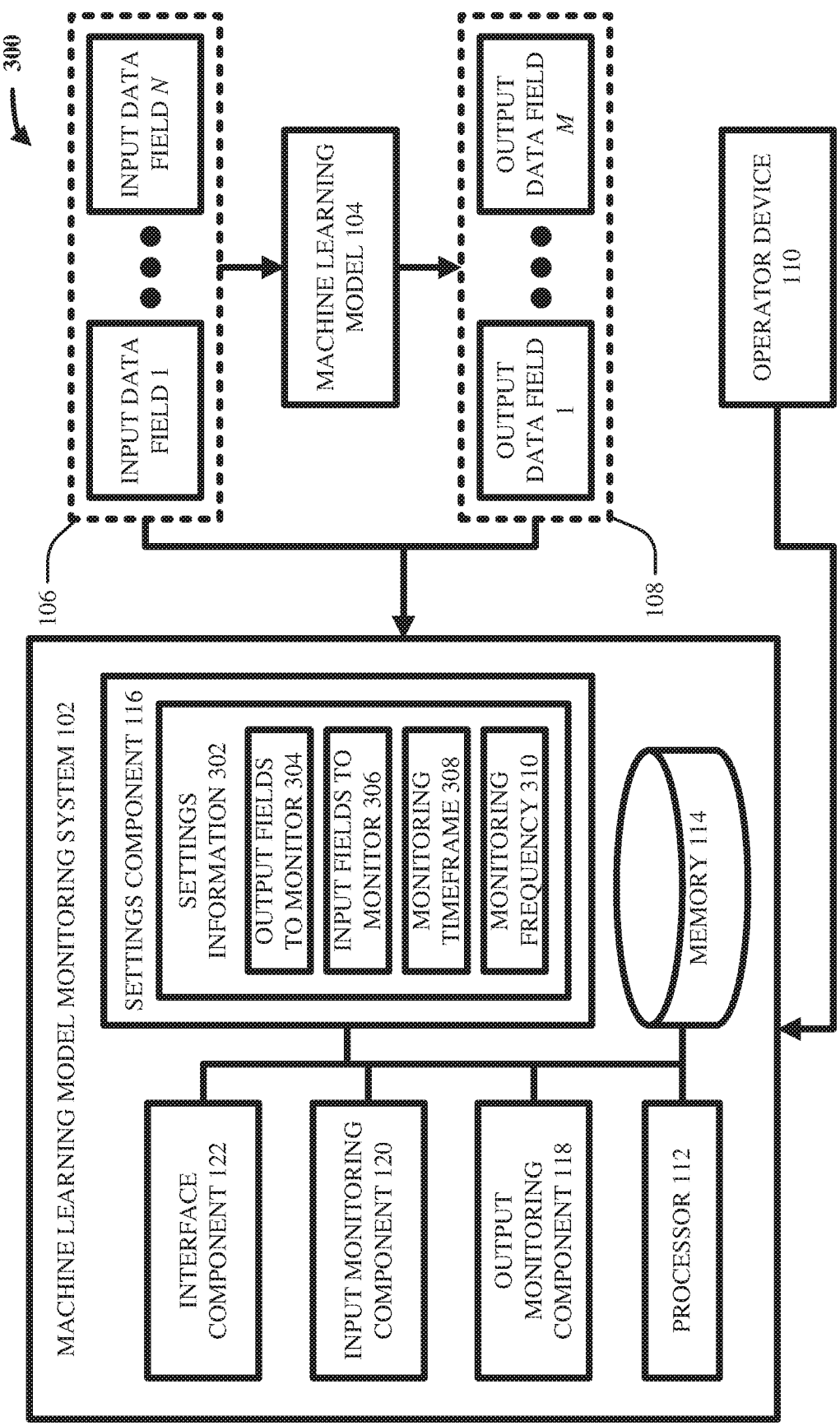
FIG. 3 illustrates a high-level block diagram of an example, non-limiting system including settings information that facilitates real-time and/or online monitoring, tracking, and/or measuring of machine learning model performance in accordance with one or more embodiments described herein.

FIG. 3 illustrates a high-level block diagram of an example, non-limiting system 300 including settings information that can facilitate real-time and/or online monitoring, tracking, and/or measuring of machine learning model performance in accordance with one or more embodiments described herein. As shown, the system 300 can, in various cases, comprise the same components as the system 100, and can further comprise settings information 302.

In various aspects, the settings component 116 can receive from the operator device 110 the settings information 302. As explained above, the settings information 302 can establish the settings and/or specifications that govern how the MLM monitoring system 102 will monitor the machine learning model 104. In various embodiments, the settings information 302 can include output fields to monitor 304. In various aspects, the output fields to monitor 304 can be considered as the indicated output fields that are described above. That is the output fields to monitor 304 can be considered as selections by the operating entity of specific output fields from the output data 108 that the operating entity desires to be monitored. In some cases, the output fields to monitor 304 can be all of the fields of the output data 108 (e.g., all M of the output data fields can be monitored). In some cases, the output fields to monitor 304 can be fewer than all of the fields of the output data 108 (e.g., fewer than all M of the output data fields can be monitored). In any case, the operating entity, via the operator device 110, can indicate and/or select which specific output fields that the operating entity desires to be monitored, and the output fields to monitor 304 can identify those indicated and/or selected output fields.

In various embodiments, the settings information 302 can include input fields to monitor 306. In various aspects, the input fields to monitor 306 can be considered as the indicated input fields that are described above. That is the input fields to monitor 306 can be considered as selections by the operating entity of specific input fields from the input data 106 that the operating entity desires to be monitored. In some cases, the input fields to monitor 306 can be all of the fields of the input data 106 (e.g., all N of the input data fields can be monitored). In some cases, the input fields to monitor 306 can be fewer than all of the fields of the input data 106 (e.g., fewer than all N of the input data fields can be monitored). In any case, the operating entity, via the operator device 110, can indicate and/or select which specific input fields and/or input attributes that the operating entity desires to be monitored, and the input fields to monitor 306 can identify those indicated and/or selected input fields/attributes.

In various embodiments, the settings information 302 can include a monitoring timeframe 308. As explained above, the monitoring timeframe 308 can be any suitable time period and/or time range over which the operating entity desires the indicated output fields (e.g., 304) and/or the indicated input fields (e.g., 306) to be monitored/evaluated. In various aspects, the monitoring timeframe 308 can be measured backward from a current time (e.g., can be measured backward from a time at which the settings information 302 is received by the settings component 116). In various instances, the monitoring timeframe 308 can have any suitable length and/or duration (e.g., seconds, minutes, hours, days, weeks, months, years, and/or so on). For instance, if the monitoring timeframe 308 is 16 hours, the values of the indicated output fields (e.g., 304) that were generated by the machine learning model 104 during the 16 hours immediately preceding the current time and/or the values of the indicated input fields (e.g., 306) that were received by the machine learning model 104 during the 16 hours immediately preceding the current time can be leveraged to monitor the machine learning model 104 (e.g., to generate the first and second metrics, as described above).

In various embodiments, the settings information 302 can include a monitoring frequency 310. As explained above, the monitoring frequency 310 can be any suitable frequency that defines how often the operating entity desires the indicated output fields (e.g., 304) and/or the indicated input fields (e.g., 306) to be monitored/evaluated. In various aspects, the monitoring frequency 310 can have any suitable magnitude (e.g., once per second, once per minute, once per hour, once per day, once per week, once per month, once per year, and/or so on). For instance, suppose that the monitoring timeframe 308 is 24 hours and that the monitoring frequency 310 is 8 hours. Then, the values of the indicated output fields (e.g., 304) that were generated by the machine learning model 104 during the 24 hours immediately preceding the current time and/or the values of the indicated input fields (e.g., 306) that were received by the machine learning model 104 during the 24 hours immediately preceding the current time can be leveraged to monitor the machine learning model 104 (e.g., to generate the first and second metrics, as described above). Next, an 8-hour pause can be implemented. After the 8-hour pause elapses, another evaluation and/or metric computation can be performed (e.g., the values of the indicated output fields (e.g., 304) that were generated by the machine learning model 104 during the 24 hours immediately preceding the new current time and/or the values of the indicated input fields (e.g., 306) that were received by the machine learning model 104 during the 24 hours immediately preceding the new current time can be leveraged to monitor the machine learning model 104).

Figure 4:
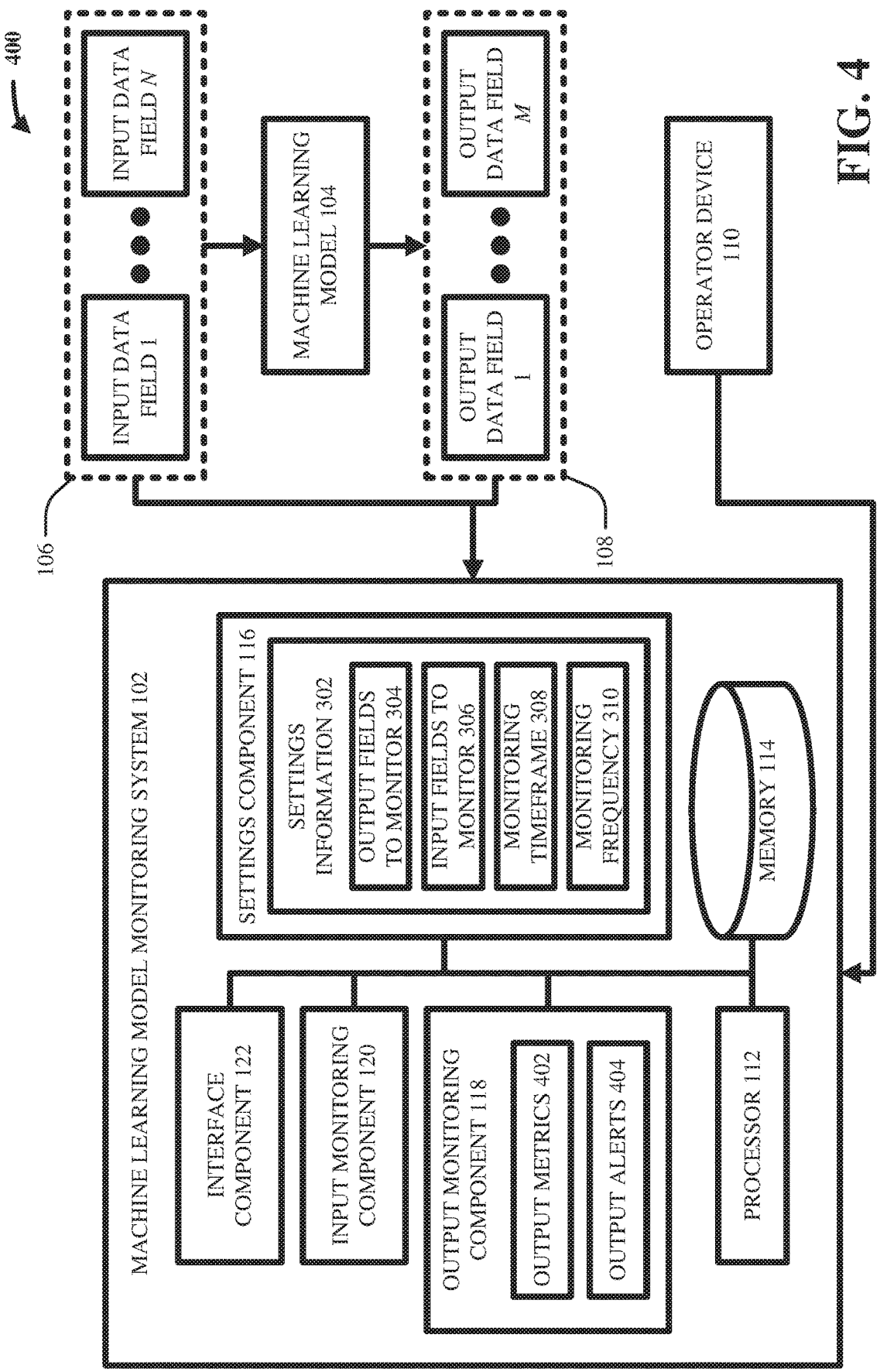
FIG. 4 illustrates a high-level block diagram of an example, non-limiting system including output metrics that facilitates real-time and/or online monitoring, tracking, and/or measuring of machine learning model performance in accordance with one or more embodiments described herein.

FIG. 4 illustrates a high-level block diagram of an example, non-limiting system 400 including output metrics that can facilitate real-time and/or online monitoring, tracking, and/or measuring of machine learning model performance in accordance with one or more embodiments described herein. As shown, the system 400 can, in some cases, comprise the same components as the system 300, and can further comprise output metrics 402.

In various embodiments, the output monitoring component 118 can generate, compute, and/or calculate the output metrics 402 based on the output fields to monitor 304 and/or based on the monitoring timeframe 308. As explained above, the output metrics 402 can be any suitable mathematical and/or statistical metrics that capture, measure, and/or indicate the performance of the machine learning model 104 over the monitoring timeframe 308 (e.g., can be computed based on the timeseries of the indicated output fields (e.g., 304) over the monitoring timeframe 308). For instance, the output metrics 402 can include precision scores for values of the indicated output fields (e.g., 304) that were generated during the monitoring timeframe 308, recall scores for values of the indicated output fields (e.g., 304) that were generated during the monitoring timeframe 308, Dice scores for values of the indicated output fields (e.g., 304) that were generated during the monitoring timeframe 308, ROC curves for values of the indicated output fields (e.g., 304) that were generated during the monitoring timeframe 308, computation times for values of the indicated output fields (e.g., 304) that were generated during the monitoring timeframe 308, and/or so on.

Although not explicitly shown in the figures, the output metrics 402 can be based in part on feedback that is associated with the indicated output fields (e.g., 304). As explained above, feedback data can be provided by the operator device 110 and/or by any other suitable technique, and such feedback data can be considered as ground truths associated with the output data 108. In other words, the output data 108 can be considered as the classifications/labels generated and/or inferred by the machine learning model 104 based on given input data, and the feedback data can be considered as the correct classifications/labels for that given input data. In various aspects, the output monitoring component 118 can have any suitable access to such feedback data, and can leverage such feedback data when generating, computing, and/or calculating the output metrics 402 (e.g., if the output monitoring component 118 has access to both the indicated output fields (e.g., 304) and to feedback associated with the indicated output fields (e.g., 304), the output monitoring component 118 can compute precision scores, recall scores, Dice scores, ROC curves, and/or so on).

In various embodiments, as shown, the output monitoring component 118 can generate output alerts 404. In various aspects, the output monitoring component 118 can generate the output alerts 404 by comparing the output metrics 402 with predetermined output thresholds (not shown in FIG. 4). In various cases, the predetermined output thresholds can be established by the operator device 110 (and/or any other suitable technique) and can define satisfactory performance of the machine learning model 104. In various aspects, if the output monitoring component 118 determines that the output metrics 402 do not satisfy the predetermined output thresholds (e.g., if the output monitoring component 118 determines that the computed precision scores, recall scores, and/or Dice scores are below threshold values), the output monitoring component 118 can electronically generate the output alerts 404, such that the output alerts 404 indicate that anomalous and/or irregular output behavior has been detected. In various aspects, the output alerts 404 can recite and/or indicate in any suitable level of detail and/or granularity that the output metrics 402 do not satisfy the predetermined output thresholds.

In various aspects, although not explicitly shown in FIG. 4, the settings information 302 can identify and/or indicate the output metrics 402 that the operating entity desires to be computed (e.g., the operator device 110 can instruct the MLM monitoring system 102 to compute particular/desired metrics). Similarly, in some cases, the settings information 302 can identify and/or indicate the predetermined output thresholds/margins.

Figure 5:
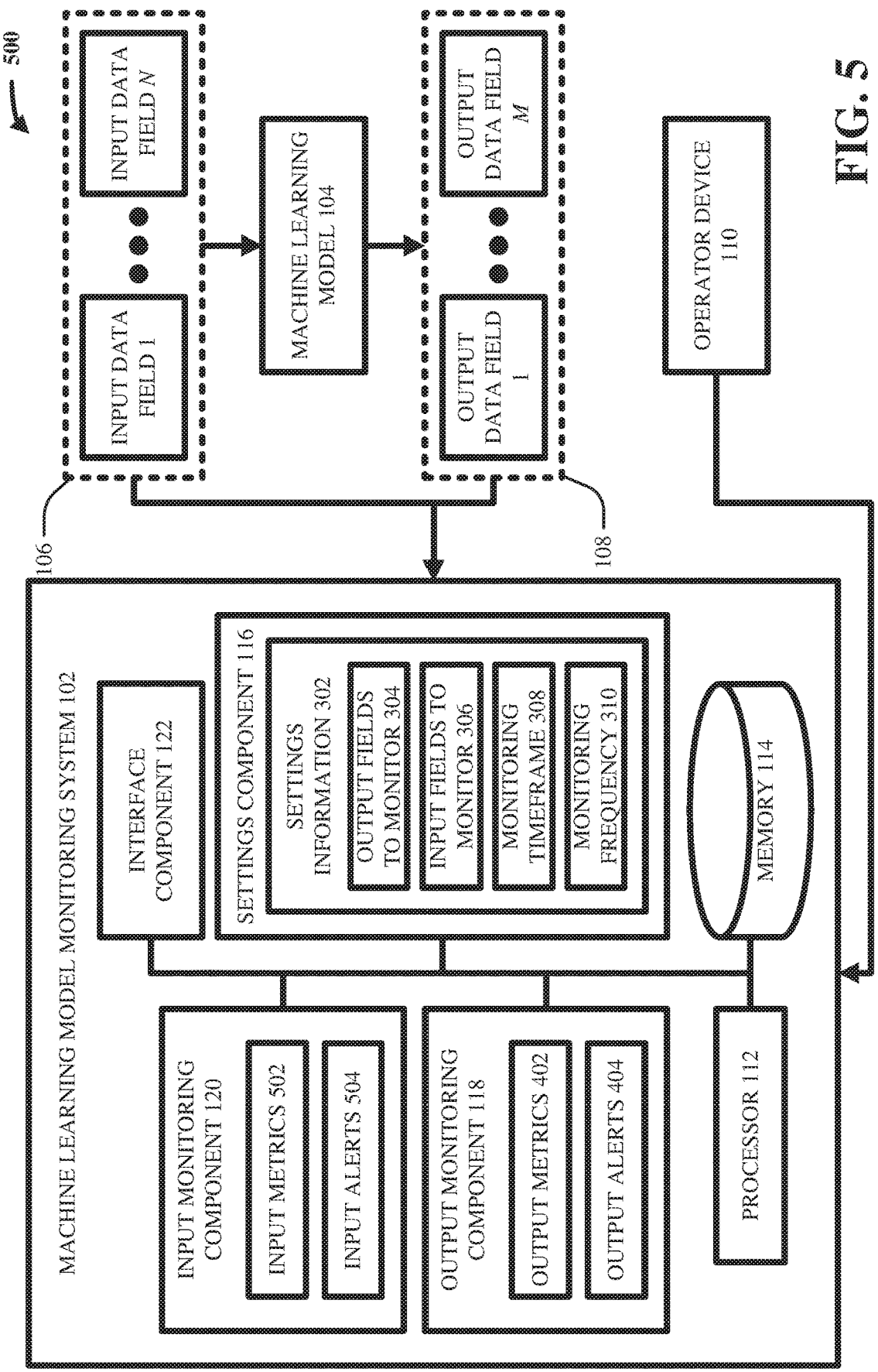
FIG. 5 illustrates a high-level block diagram of an example, non-limiting system including input metrics that facilitates real-time and/or online monitoring, tracking, and/or measuring of machine learning model performance in accordance with one or more embodiments described herein.

FIG. 5 illustrates a high-level block diagram of an example, non-limiting system 500 including input metrics that can facilitate real-time and/or online monitoring, tracking, and/or measuring of machine learning model performance in accordance with one or more embodiments described herein. As shown, the system 500 can, in some cases, comprise the same components as the system 400, and can further comprise input metrics 502.

In various embodiments, the input monitoring component 120 can generate, compute, and/or calculate the input metrics 502 based on the input fields to monitor 306 and/or based on the monitoring timeframe 308. As explained above, the input metrics 502 can be any suitable mathematical and/or statistical metrics that capture, measure, and/or indicate the trends, distributions, and/or behaviors of the indicated data fields (e.g., 306) over the monitoring timeframe 308 (e.g., can be computed based on the timeseries of the indicated input fields (e.g., 306) over the monitoring timeframe 308). For instance, the input metrics 502 can include maximum values of the indicated input fields (e.g., 306) that were received during the monitoring timeframe 308, minimum values of the indicated input fields (e.g., 306) that were received during the monitoring timeframe 308, average values of the indicated input fields (e.g., 306) that were received during the monitoring timeframe 308, standard deviations of the indicated input fields (e.g., 306) that were received during the monitoring timeframe 308, skewness values of the indicated input fields (e.g., 306) that were received during the monitoring timeframe 308, kurtosis values of the indicated input fields (e.g., 306) that were received during the monitoring timeframe 308, histograms of the indicated input fields (e.g., 306) that were received during the monitoring timeframe 308, and/or so on. In various aspects, multiple different metrics can be computed/calculated for each identified input field.

In various embodiments, as shown, the input monitoring component 120 can generate input alerts 504. In various aspects, the input monitoring component 120 can generate the input alerts 504 by comparing the input metrics 502 with predetermined input thresholds (not shown in FIG. 5). In various cases, the predetermined input thresholds can be established by the operator device 110 (and/or by any other suitable technique) and can define satisfactory trends, distributions, and/or behaviors of the indicated input fields (e.g., 306). Although not explicitly shown in FIG. 5, the predetermined input thresholds can be based on baseline metrics that correspond to training data (and/or testing/validation data) on which the machine learning model 104 was trained (and/or tested/validated). In various aspects, such baseline metrics can be any suitable mathematical and/or statistical metrics that capture, measure, and/or indicate the trends, distributions, and/or behaviors of the training data on which the machine learning model 104 was trained. In other words, the baseline metrics can be of a same format and/or dimensionality as the input metrics 502 so as to permit comparison. In various cases, the input monitoring component 120 can compare the input metrics 502 with the predetermined input thresholds (e.g., with the baseline metrics characterizing the training data). In various aspects, if the input monitoring component 120 determines that the input metrics 502 do not satisfy the predetermined input thresholds (e.g., if the input monitoring component 120 determines that the computed maximums, minimums, averages, and/or standard deviations differ from the baseline maximums, minimums, averages, and/or standard deviations by more than a predetermined margin), the input monitoring component 120 can electronically generate the input alerts 504, such that the input alerts 504 indicate that anomalous and/or irregular input behavior has been detected. In various aspects, the input alerts 504 can recite and/or indicate in any suitable level of detail and/or granularity that the input metrics 502 do not satisfy the predetermined input thresholds.

In various aspects, although not explicitly shown in FIG. 5, the settings information 302 can identify and/or indicate the input metrics 502 that the operating entity desires to be computed (e.g., the operator device 110 can instruct the MLM monitoring system 102 to compute particular/desired metrics). Similarly, in some cases, the settings information 302 can identify and/or indicate the predetermined input thresholds/margins.

As explained above, the interface component 122 can, in various embodiments, display and/or visually render the output metrics 402, the output alerts 404, the input metrics 502, and/or the input alerts 504 on an electronic display, screen, and/or monitor. For instance, the interface component 122 can transmit an electronic instruction (not shown in the figures) to the operator device 110, which can cause the operator device 110 to render and/or display the output metrics 402, the output alerts 404, the input metrics 502, and/or the input alerts 504. In this way, the operating entity can be informed of the output metrics 402, the output alerts 404, the input metrics 502, and/or the input alerts 504.

Figure 6:
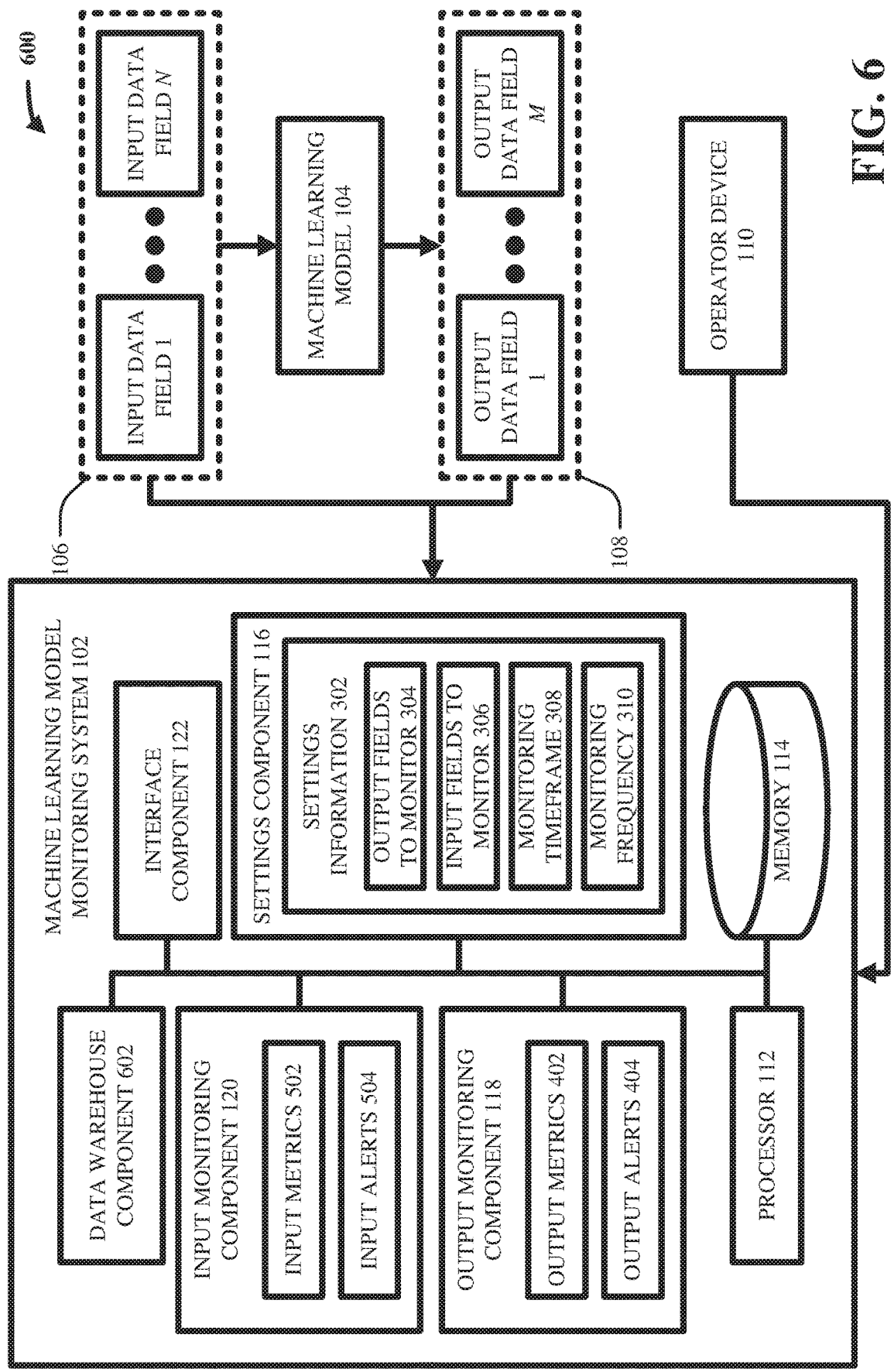
FIG. 6 illustrates a high-level block diagram of an example, non-limiting system including a data warehouse component that facilitates real-time and/or online monitoring, tracking, and/or measuring of machine learning model performance in accordance with one or more embodiments described herein.

FIG. 6 illustrates a high-level block diagram of an example, non-limiting system 600 including a data warehouse component that can facilitate real-time and/or online monitoring, tracking, and/or measuring of machine learning model performance in accordance with one or more embodiments described herein. As shown, the system 600 can, in some cases, comprise the same components as the system 500, and can further comprise a data warehouse component 602.

In various embodiments, the data warehouse component 602 can electronically store and/or maintain the output metrics 402, the output alerts 404, the input metrics 502, and/or the input alerts 504. In various aspects, the data warehouse component 602 can be accessible to the operator device 110, such that the operator device 110 can select which results, computed metrics, and/or alerts/warnings to be displayed/transmitted by the interface component 122.

Figure 7:
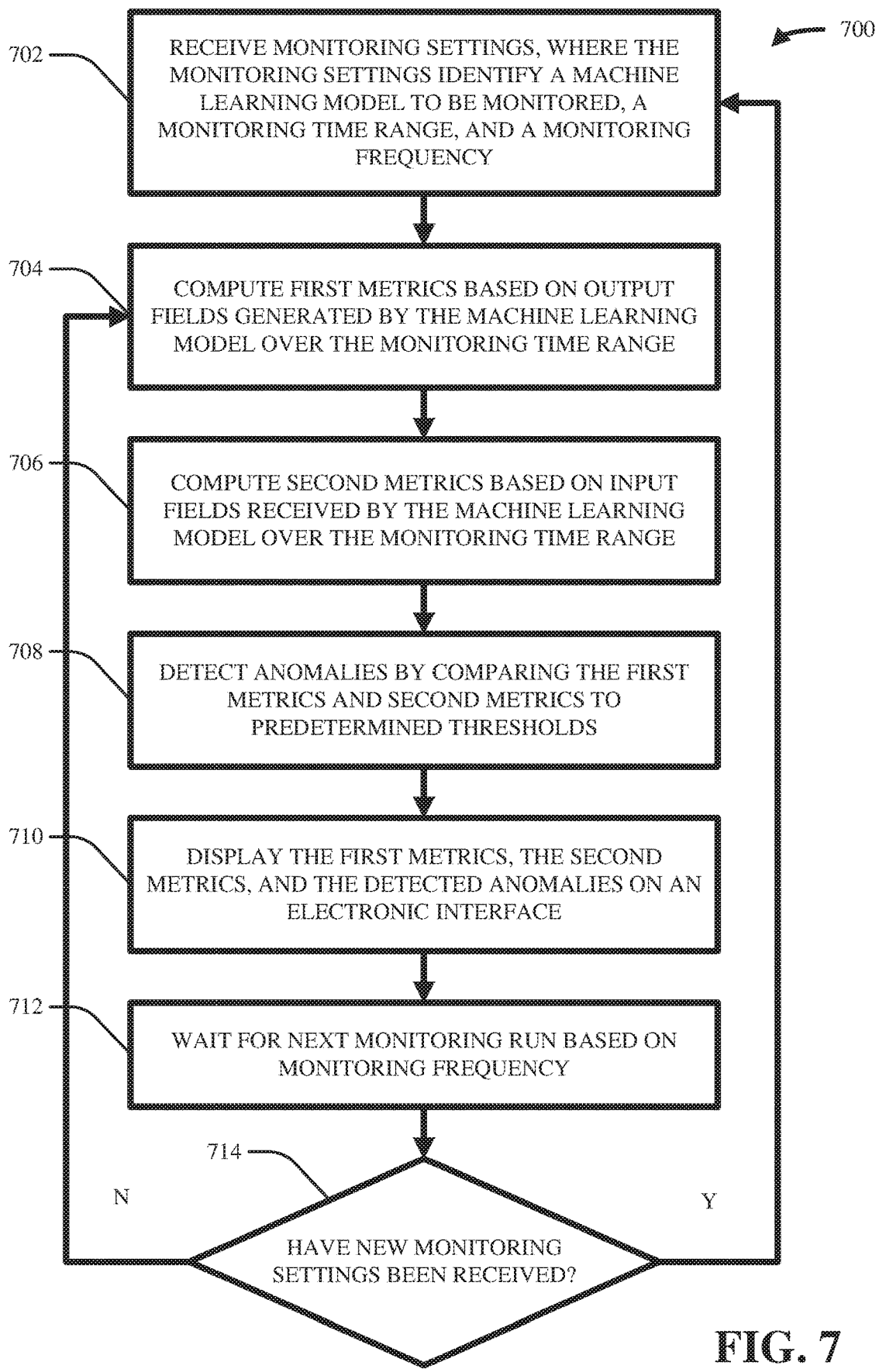
FIG. 7 illustrates a high-level flow diagram of an example, non-limiting computer-implemented method that facilitates real-time and/or online monitoring, tracking, and/or measuring of machine learning model performance in accordance with one or more embodiments described herein.

FIG. 7 illustrates a high-level flow diagram of an example, non-limiting computer-implemented method 700 that can facilitate real-time and/or online monitoring, tracking, and/or measuring of machine learning model performance in accordance with one or more embodiments described herein.

In various embodiments, act 702 can include receiving (e.g., by 116) monitoring settings (e.g., 302). In various cases, the monitoring settings can identify a machine learning model (e.g., 104) to be monitored, a monitoring time range (e.g., 308), and/or a monitoring frequency (e.g., 310).

In various instances, act 704 can include computing first metrics (e.g., 402) based on output fields (e.g., 304 and/or 108) generated by the machine learning model over and/or during the monitoring time range.

In various aspects, act 706 can include computing second metrics (e.g., 502) based on input fields (e.g., 306 and/or 106) received by the machine learning model over and/or during the monitoring time range.

In various embodiments, act 708 can include detecting anomalies by comparing the first metrics and/or the second metrics to predetermined and/or predefined thresholds.

In various instances, act 710 can include displaying the first metrics, the second metrics, and/or indications of the detected anomalies on an electronic interface (e.g., via 122).

In various aspects, act 712 can include waiting for the next monitoring run based on the monitoring frequency.

In various embodiments, act 714 can include determining whether new monitoring settings have been received. If so, the computer-implemented method 700 can proceed back to act 702. If not, the computer-implemented method 700 can instead proceed back to act 704 (e.g., thereby iteratively computing metrics, detecting anomalies, and/or displaying results according to the monitoring frequency until new settings are received).

Although not explicitly shown in the figures, the MLM monitoring system 102 can, in various embodiments, update and/or correct parameters of the machine learning model 104 based on the output alerts 404 and/or based on the input alerts 504. In other words, the MLM monitoring system 102 can, in some cases, automatically retrain (e.g., via backpropagation and/or any other suitable training technique) the machine learning model 104 after detecting anomalous and/or irregular behavior in the output metrics 402 and/or in the input metrics 502. To facilitate such retraining, the MLM monitoring system 102 can have any suitable form of wired and/or wireless electronic access to a database of training features (not shown in the figures). Thus, when the MLM monitoring system 102 detects anomalous and/or irregular behavior of the indicated output fields (e.g., 304) and/or of the indicated input fields (e.g., 306), the MLM monitoring system 102 can query the database of training features for a retraining dataset that matches and/or corresponds to the input metrics 502 (e.g., since the current values of the indicated input fields (e.g., 306) are no longer sufficiently similar to the original training data, new training data that is similar to the current values of the indicated input fields (e.g., 306) is required for proper retraining), and the MLM monitoring system 102 can automatically commence and/or initiate retraining of the machine learning model 104 based on the retraining dataset. In various aspects, the database of training features can be any suitable database and/or data structure (e.g., centralized and/or distributed, graph and/or relational).

Figure 8:
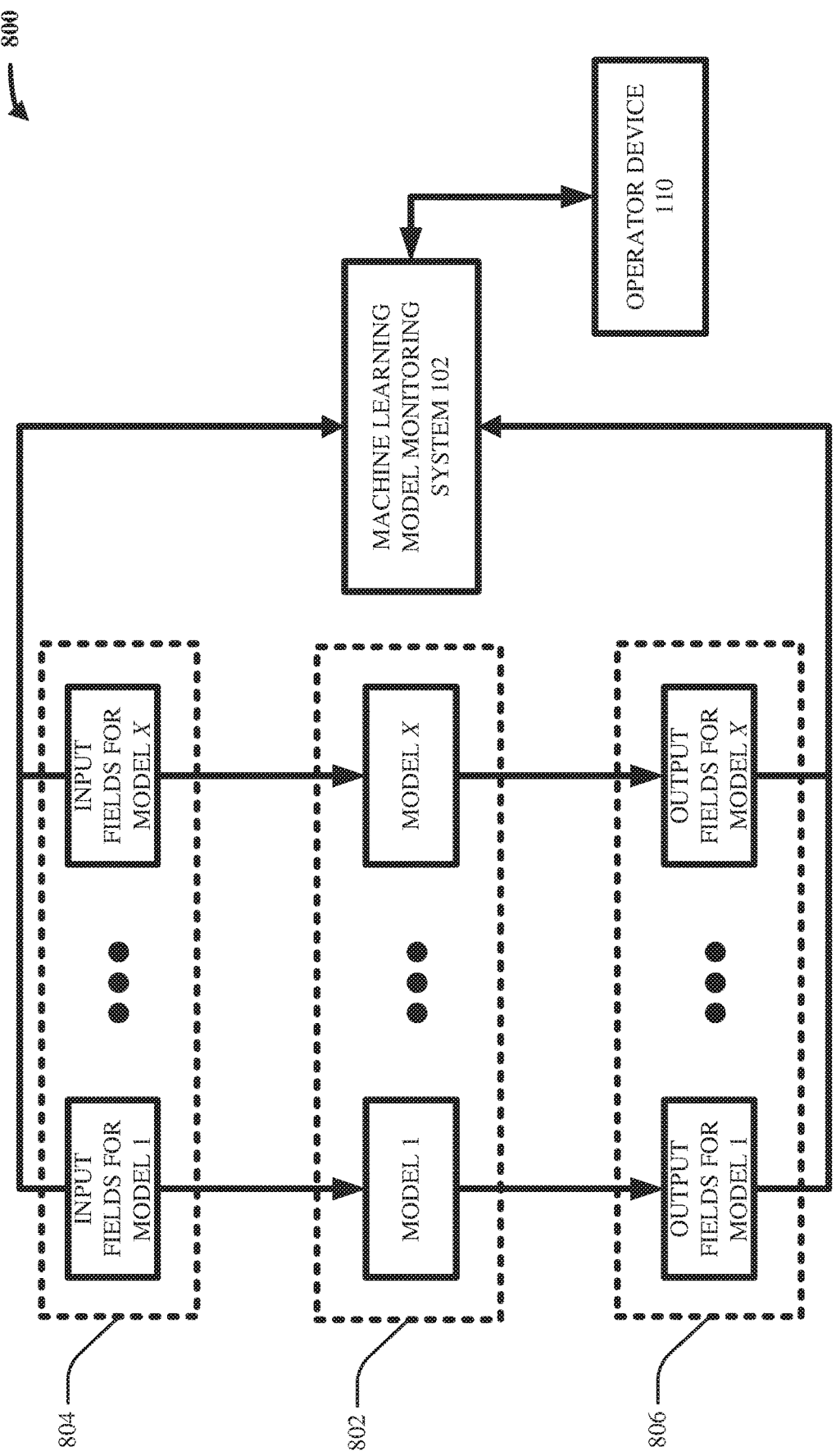
FIG. 8 illustrates a high-level block diagram of an example, non-limiting system that facilitates real-time and/or online monitoring, tracking, and/or measuring of performance of multiple deployed machine learning models in accordance with one or more embodiments described herein.

FIG. 8 illustrates a high-level block diagram of an example, non-limiting system 800 that can facilitate real-time and/or online monitoring, tracking, and/or measuring of performance of multiple deployed machine learning models in accordance with one or more embodiments described herein.

As explained above, various embodiments of the subject innovation can involve having the MLM monitoring system 102 integrated with a machine learning model 104 that is deployed in the field, so as to monitor both the outputs generated by and the inputs received by the machine learning model 104 in real-time. However, in various aspects, the MLM monitoring system 102 can be integrated with a plurality of machine learning models 802 that are deployed in the field (e.g., any suitable number of deployed and possibly unrelated machine learning models). As shown in FIG. 8, the plurality of machine learning models 802 can include X machine learning models for any suitable integer X (e.g., model 1 to model X). As also shown in FIG. 8, the plurality of machine learning models 802 can be associated with a plurality of input fields 804 and a plurality of output fields 806. As shown, each model in the plurality of machine learning models 802 can receive its own corresponding set of input fields and can generate its own corresponding set of output fields (e.g., the model 1 can receive the input fields for model 1 and can generate the output fields for model 1; the model X can receive the input fields for model X and can generate the output fields for model X). Moreover, as shown, the MLM monitoring system 102 can have electronic access to the plurality of input fields 804 and to the plurality of output fields 806. Accordingly, the MLM monitoring system 102 can monitor, as described above, any of the plurality of machine learning models 802. In various instances, the operating entity can, via the operator device 110, select and/or indicate (e.g., via the settings information 302) which models in the plurality of machine learning models 802 the operating entity desires to be monitored, and the MLM monitoring system 102 can monitor such selected/indicated models accordingly.

Figure 9:
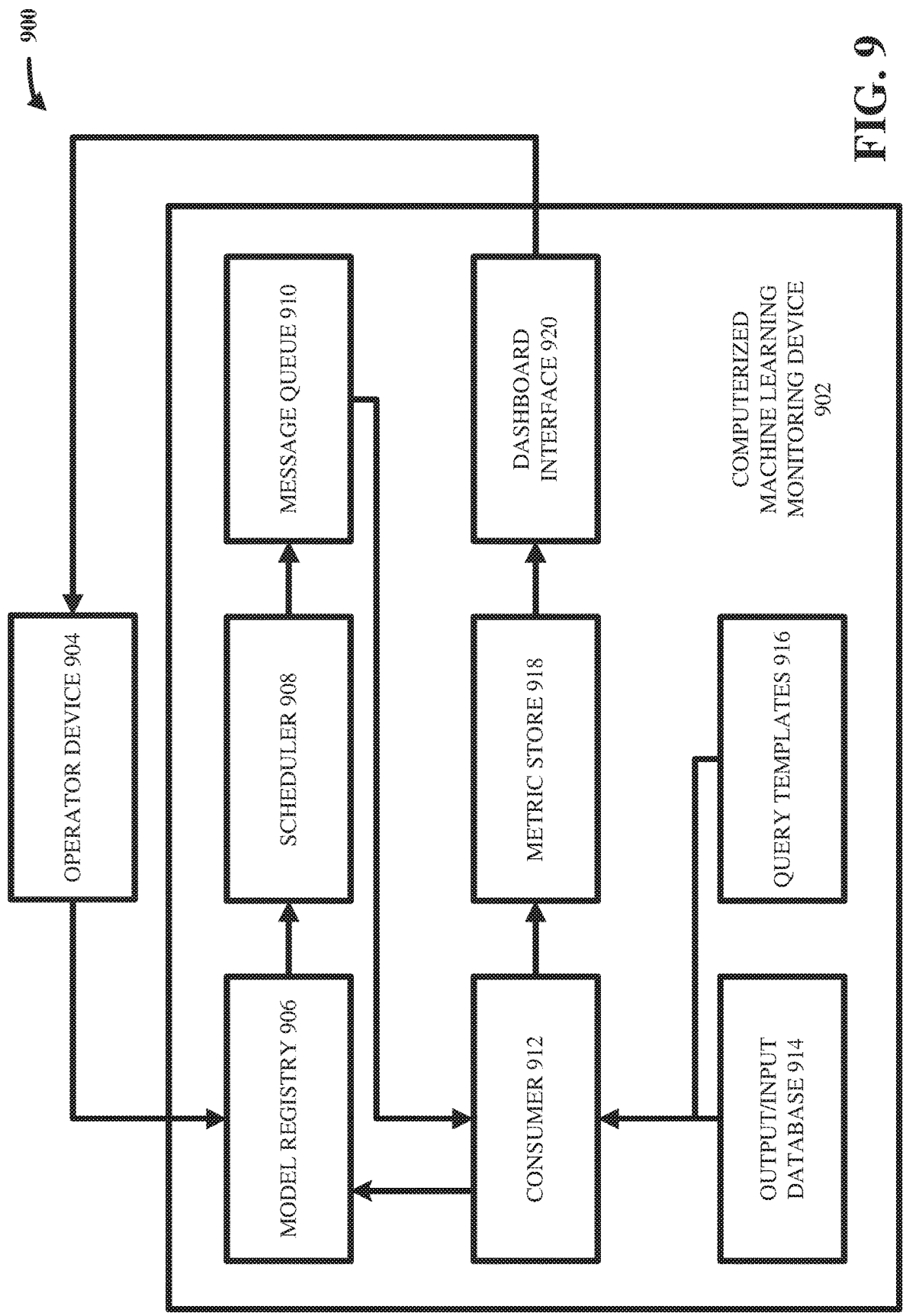
FIG. 9 illustrates a high-level block diagram of an example, non-limiting system that facilitates real-time and/or online monitoring, tracking, and/or measuring of machine learning model performance in accordance with one or more embodiments described herein.

FIG. 9 illustrates a high-level block diagram of an example, non-limiting system 900 that can facilitate real-time and/or online monitoring, tracking, and/or measuring of machine learning model performance in accordance with one or more embodiments described herein. In various aspects, FIG. 9 can be considered as depicting an exemplary, non-limiting embodiment and/or implementation of the subject innovation.

As shown, the system 900 can include a computerized machine learning monitoring device 902 that is configured to monitor, track, and/or measure the performance of a machine learning model to be monitored (not shown in FIG. 9). In various aspects, an operating entity (e.g., analyst, administrator, software engineer) can interact with the computerized machine learning monitoring device 902 through an operator device 904 (e.g., any suitable desktop computer, laptop computer, smart phone, tablet, and/or so on). In various aspects, the operator device 904 can perform any suitable authentication protocols in order to ensure that the operating entity has appropriate viewing privileges, editing privileges, creating privileges, deleting privileges, and/or so on with respect to settings and/or parameters of the machine learning model to be monitored and/or with respect to settings and/or parameters of the computerized machine learning monitoring device 902 (e.g., the operator device 904 can institute password/passcode authentication, fingerprint authentication, facial recognition authentication, voice recognition authentication, any other suitable form of biometric authentication, and/or so on to ensure that the operating entity has appropriate credentials).

In various aspects, the operator device 904 can provide to a model registry 906 settings information that governs how the computerized machine learning monitoring device 902 will monitor, track, and/or measure the performance of the machine learning model to be monitored. In various aspects, the settings information can identify the machine learning model to be monitored (e.g., can identify any suitable metadata regarding the machine learning model to be monitored), can identify which output features generated by the machine learning model are to be monitored/tracked, can identify which input features received by the machine learning model are to be monitored/tracked, can identify the timeframe over which the identified output features and/or the identified input features are to be aggregated and/or evaluated, can identify a frequency indicating how often the identified output features and/or the identified input features are to be monitored/evaluated, can identify specific metrics to be calculated based on the identified output features and/or the identified input features, can identify/setup cutoff thresholds, can identify/setup realization periods, can identify/flag specific columns/rows/subsets of data in the identified output features and/or the identified input features, can identify any other suitable monitoring settings, and/or so on. In various aspects, when the operator device 904 provides the settings information to the model registry 906, this can be considered as registering the machine learning model to be monitored with the computerized machine learning monitoring device 902. In various aspects, the settings information that governs how the computerized machine learning monitoring device 902 is supposed to monitor the machine learning model can be considered and/or referred to as a monitoring configuration.

In an exemplary, non-limiting embodiment, the monitoring configuration can include: an identifier and/or name of the machine learning model to be monitored (e.g., in the form of character strings); an identifier and/or name of the operating entity (e.g., in the form of character strings); one or more identifiers and/or names corresponding to one or more outputted decision/classification/label fields generated by the machine learning model to be monitored (e.g., in the form of character strings); one or more identifiers and/or names corresponding to one or more feedback fields respectively corresponding to the one or more outputted decision/classification/label fields (e.g., in the form of character strings); one or more identifiers and/or names corresponding to one or more outputted score fields generated by the machine learning model to be monitored (e.g., in the form of character strings; note that the machine learning model can generate one or more numerical scores based on particular input data, and the values of those one or more numerical scores can determine the decisions/classifications/labels that are created for that particular input data); one or more weights associated with the one or more feedback fields (e.g., in the form of numbers); one or more outputted decision/classification/label datasets generated by the machine learning model to be monitored (e.g., in the form of character strings and/or numbers); one or more outputted score datasets generated by the machine learning model to be monitored (e.g., in the form of numbers); one or more inputted datasets received by the machine learning model to be monitored (e.g., in the form of numbers); and/or so on. As a more specific example, for a machine learning model that is configured to distinguish between fraudulent and non-fraudulent transactions, the monitoring configuration can include a dataset containing the fraud-positive labels generated by the machine learning model during the monitoring timeframe, a dataset containing the fraud-negative labels generated by the machine learning model during the monitoring timeframe, a dataset containing chargebacks that occurred during the monitoring timeframe (e.g., a chargeback means that the transaction was ultimately unsuccessful, and thus can be considered as a form of feedback), and/or a dataset containing various input features/attributes relating to transactions (e.g., transaction amount, time/date of transaction, identity of merchant facilitating transaction, and/or so on).

In various aspects, a scheduler 908 can detect a newly-added monitoring configuration (e.g., can detect when a newly-registered model is added) in the model registry 906, and can accordingly schedule and/or place the newly-added monitoring configuration into a message queue 910. In various aspects, the scheduler 908 can load monitoring configurations into the message queue 910 with any suitable frequency (e.g., once a day, once an hour, once a week, and/or so on).

In various instances, a consumer 912 can periodically check the message queue 910 for monitoring configurations. In various aspects, the consumer 912 can be considered as a computation engine. When the consumer 912 encounters a monitoring configuration in the message queue 910, the consumer 912 can process the monitoring configuration. That is, the consumer 912 can gather from appropriate sources all input data, output data, and/or feedback data that are identified in the monitoring configuration, and can compute desired metrics based on such input data, output data, and/or feedback data. Specifically, in various cases, the monitoring configuration can identify which output fields are to be monitored over which timeframe, and the consumer 912 can receive and/or retrieve from an output/input database 914 the values of those identified output fields that were generated by the machine learning model during the identified timeframe (and/or can also receive/retrieve feedback values that are associated with the received/retrieved output values). Similarly, in various cases, the monitoring configuration can identify which input fields are to be monitored over which timeframe, and the consumer 912 can receive and/or retrieve from the output/input database 914 the values of those identified input fields that were received by the machine learning model during the identified timeframe. In various cases, the output/input database 914 can be any suitable centralized and/or distributed data structure that stores and/or maintains the input data received by the machine learning model to be monitored, the output data generated by the machine learning model to be monitored, and/or the feedback data associated with the machine learning model to be monitored.

Moreover, in various aspects, the consumer 912 can select one or more query templates 916. In various cases, the query templates 916 can be pre-made templates and/or programming scripts into which particular data can be inserted and which can be executed to perform particular computations on the inserted data. In various instances, the consumer 912 can insert the output data and/or the input data that are received/retrieved from the output/input database 914 into the one or more selected query templates 916, and the consumer 912 can execute the one or more selected query templates 916, thereby computing desired metrics based on the inserted output data and/or input data. In some cases, a query template can be configured so that output data (e.g., decisions, predictions, classifications, labels) and/or feedback data can be inserted into the query template, and so that execution of the query template generates statistical metrics based on the inserted output data and/or the inserted feedback data (e.g., precision scores, recall scores, Dice scores, ROC curves). In other cases, a query template can be configured so that input data (e.g., transaction amounts, transaction times/dates, transaction products/services) can be inserted into the query template, and so that execution of the query template generates statistical metrics based on the inserted input data (e.g., mins, maxes, means, standard deviations, kurtosis, histograms). In some cases, query templates can be used only for output metric computation and not for input metric computation. In some cases, the monitoring configuration can identify desired metrics to be computed. Accordingly, the consumer 912 can learn of the desired metrics by reading the monitoring configuration in the message queue 910 and can choose one or more query templates 916 that correspond to the desired metrics.

In various aspects, the consumer 912 can also compare any generated metrics to predetermined and/or predefined threshold values (e.g., in some cases, such predetermined and/or predefined threshold values can be identified by the operator device 904 in the monitoring configuration. If the consumer 912 determines that a generated metric does not satisfy a corresponding predetermined and/or predefined threshold value (e.g., differs from the threshold by predetermined margin), the consumer 912 can generate warnings and/or alerts indicating that anomalous metrics have been detected.

In various cases, the consumer 912 can run at any suitable frequency (e.g., continuously, once a minute, once an hour, once a day, once a week, and/or so on).

In various aspects, the consumer 912 can store the generated metrics and/or the generated alerts/warnings in a metric store 918 (e.g., any suitable centralized and/or distributed database and/or data structure). In various cases, the consumer 912 can indicate to the model registry 906 that metrics for this particular monitoring configuration have been computed (e.g., can update the status of this particular monitoring configuration in the model registry 906).

In various instances, the operator device 904 can electronically interact and/or communicate with a dashboard interface 920 in order to select and/or view metrics and/or alerts/warnings from the metric store 918 (e.g., the dashboard interface 920 can transmit any selected metrics and/or alerts/warnings to the operator device 904).

Figure 10:
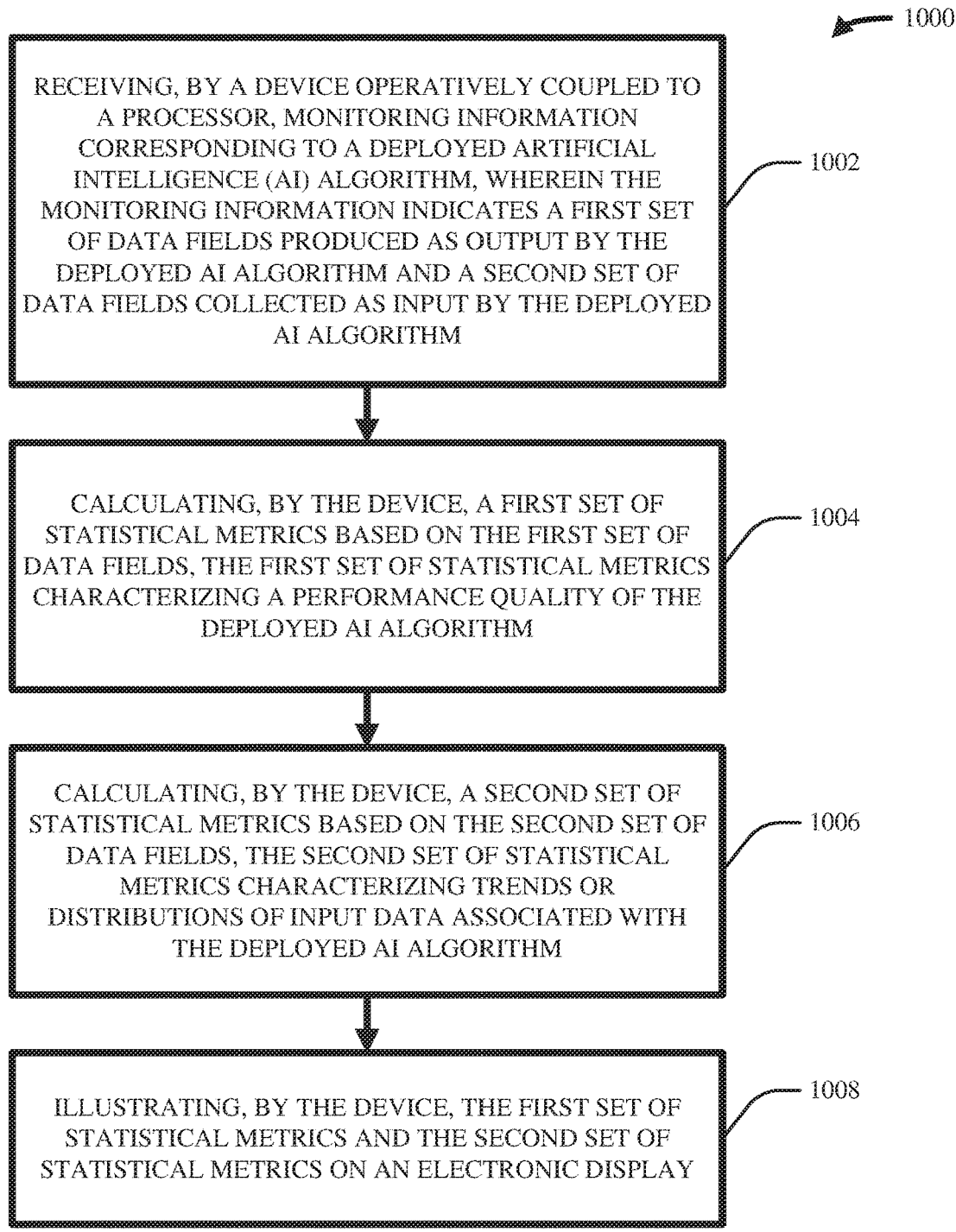
FIG. 10 illustrates a high-level flow diagram of an example, non-limiting computer-implemented method that facilitates real-time and/or online monitoring, tracking, and/or measuring of machine learning model performance in accordance with one or more embodiments described herein.

FIG. 10 illustrates a high-level flow diagram of an example, non-limiting computer-implemented method 1000 that can facilitate real-time and/or online monitoring, tracking, and/or measuring of machine learning model performance in accordance with one or more embodiments described herein.

In various embodiments, act 1002 can include receiving, by a device operatively coupled to a processor (e.g., 116), monitoring information (e.g., 302) corresponding to a deployed artificial intelligence (AI) algorithm (e.g., 104). In various cases, the monitoring information can indicate a first set of data fields (e.g., 304) produced as output by the deployed AI algorithm, and can identify a second set of data fields (e.g., 306) collected as input by the deployed AI algorithm.

In various aspects, act 1004 can include calculating, by the device (e.g., 118), a first set of statistical metrics (e.g., 402) based on the first set of data fields. In various cases, the first set of statistical metrics can characterize a performance quality of the deployed AI algorithm.

In various instances, act 1006 can include calculating, by the device (e.g., 120), a second set of statistical metrics (e.g., 502) based on the second set of data fields. In various cases, the second set of statistical metrics can characterize trends and/or distributions of input data associated with the deployed AI algorithm.

In various embodiments, act 1008 can include illustrating, by the device (e.g., 122), the first set of statistical metrics and the second set of statistical metrics on an electronic display.

In various embodiments, the computer-implemented method 1000 can further include: detecting, by the device (e.g., 118 and/or 120), irregularities in the first set of statistical metrics and/or in the second set of statistical metrics, based on the first set of statistical metrics and/or the second set of statistical metrics being above and/or below predetermined and/or predefined thresholds; and generating, by the device (e.g., 118 and/or 120), an alert (e.g., 404 and/or 504), wherein the alert flags, indicates, identifies, and/or otherwise provides details regarding detected irregularities.

In various embodiments, the computer-implemented method 1000 can further include: comparing, by the device (e.g., 120), the second set of statistical metrics characterizing trends or distributions of input data associated with the deployed AI algorithm with baseline statistical metrics characterizing trends or distributions of training data associated with the deployed AI algorithm; and generating, by the device (e.g., 120), an alert (e.g., 504) based on the comparison, wherein the alert indicates that additional training (and/or revalidation) of the deployed AI algorithm is recommended.

In various aspects, it can be difficult for a machine learning model to hold and/or maintain high performance when deployed in the field. This can be due to fluctuations in the input data (e.g., the data fields/attributes that the machine learning model is fed and which the machine learning model analyzes). After all, a machine learning model can be expected to perform well only when the input data which is received is sufficiently similar to the training data on which the model was configured. Indeed, a trend and/or distribution change in a single input feature/attribute can negatively affect the performance of the entire model. Various embodiments of the subject innovation can address this problem by monitoring not only the output generated by the machine learning model, but also the input received by the machine learning model. Embodiments of the subject innovation can promptly alert an operator, analyst, and/or software engineer when the real-world input data is no longer sufficiently similar to the training data. Thus, the operator can manage the machine learning model on the basis of up-to-date and data-driven information that conventional systems/techniques simply do not provide.

In various instances, embodiments of the subject innovation can perform analyses on selected input and/or output datasets for different time ranges, can compute various metrics based on the selected input and/or output datasets, and/or can track/detect anomalies by comparing the computed/calculated metrics to predetermined thresholds. In various aspects, the computed metrics and/or indications of the detected anomalies can be stored in a data warehouse, and an interface can allow operators, analysts, and/or software engineers to view and/or display the metrics as desired. In various cases, operators, analysts, and/or software engineers can leverage these metrics when defining and/or refining parameters of the machine learning model.

Figure 11:
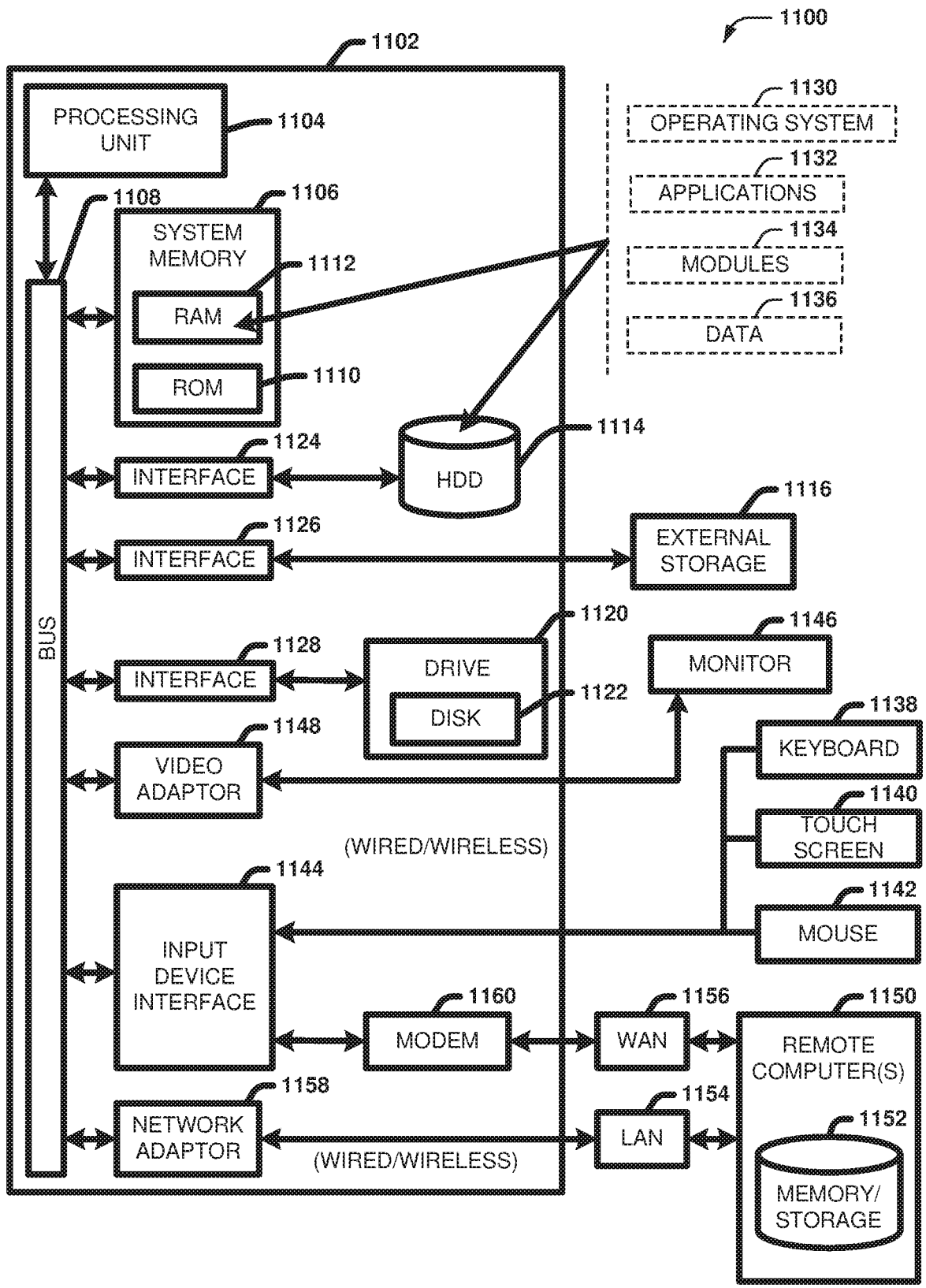
FIG. 11 illustrates a block diagram of an example, non-limiting operating environment in which one or more embodiments described herein can be facilitated.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and a drive 1120, e.g., such as a solid state drive, an optical disk drive, which can read or write from a disk 1122, such as a CD-ROM disc, a DVD, a BD, etc. Alternatively, where a solid state drive is involved, disk 1122 would not be included, unless separate. While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and drive 1120 can be connected to the system bus 1108 by an HDD interface 1124, an external storage interface 1126 and a drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above, such as but not limited to a network virtual machine providing one or more aspects of storage or processing of information. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
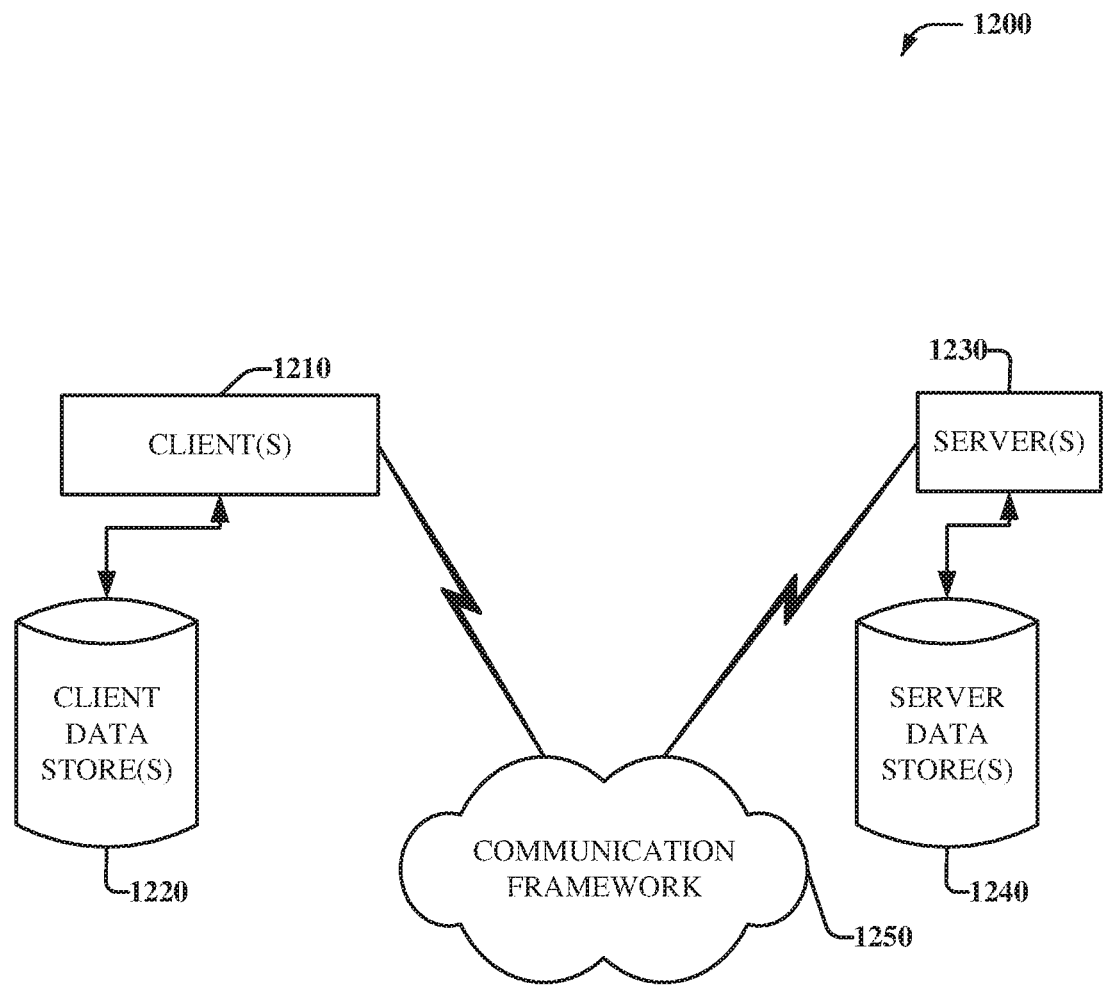
FIG. 12 illustrates an example networking environment operable to execute various implementations described herein.

FIG. 12 is a schematic block diagram of a sample computing environment 1200 with which the disclosed subject matter can interact. The sample computing environment 1200 includes one or more client(s) 1210. The client(s) 1210 can be hardware and/or software (e.g., threads, processes, computing devices). The sample computing environment 1200 also includes one or more server(s) 1230. The server(s) 1230 can also be hardware and/or software (e.g., threads, processes, computing devices). The servers 1230 can house threads to perform transformations by employing one or more embodiments as described herein, for example. One possible communication between a client 1210 and a server 1230 can be in the form of a data packet adapted to be transmitted between two or more computer processes. The sample computing environment 1200 includes a communication framework 1250 that can be employed to facilitate communications between the client(s) 1210 and the server(s) 1230. The client(s) 1210 are operably connected to one or more client data store(s) 1220 that can be employed to store information local to the client(s) 1210. Similarly, the server(s) 1230 are operably connected to one or more server data store(s) 1240 that can be employed to store information local to the servers 1230.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a standalone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer-executable instructions stored in a memory, which causes the processor to:
receive monitoring settings associated with a machine learning model to be monitored, wherein the monitoring settings identify a first set of data features generated as output by the machine learning model and a second set of data features received as input by the machine learning model;
compute a first set of statistical metrics based on the first set of data features, the first set of statistical metrics characterizing a performance quality of the machine learning model;
compute a second set of statistical metrics based on the second set of data features, the second set of statistical metrics characterizing trends or distributions of input data associated with the machine learning model;
store the first set of statistical metrics and the second set of statistical metrics in a data warehouse;
identify anomalies in the first set of statistical metrics or in the second set of statistical metrics, based on the first set of statistical metrics or the second set of statistical metrics being above or below predetermined thresholds; and
generate an alert that flags identified anomalies.

2. The system of claim 1, wherein the computer-executable instructions are further executable to cause the processor to:
render the first set of statistical metrics and the second set of statistical metrics on an electronic interface.

3. The system of claim 1, wherein the computer-executable instructions are further executable to cause the processor to:
compare the second set of statistical metrics characterizing trends or distributions of input data associated with the machine learning model with baseline statistical metrics characterizing trends or distributions of training data associated with the machine learning model; and
generate an alert based on the comparison, wherein the alert indicates that additional training of the machine learning model is recommended.

4. The system of claim 1, wherein the first set of statistical metrics are computed based on feedback associated with the first set of data features generated as output by the machine learning model.

5. The system of claim 1, wherein the monitoring settings identify the first set of statistical metrics and the second set of statistical metrics as metrics to be computed.

6. The system of claim 1, wherein the first set of statistical metrics include precision values, recall values, or Dice scores associated with the first set of data features generated as output by the machine learning model.

7. The system of claim 1, wherein the second set of statistical metrics include means, standard deviations, minimums, maximums, or cardinalities associated with the second set of data features received as input by the machine learning model.

8. A computer-implemented method, comprising:
receiving, by a device operatively coupled to a processor, monitoring information corresponding to a deployed artificial intelligence (AI) algorithm, wherein the monitoring information indicates a first set of data fields produced as output by the deployed AI algorithm and a second set of data fields collected as input by the deployed AI algorithm;
calculating, by the device, a first set of statistical metrics based on the first set of data fields, the first set of statistical metrics characterizing a performance quality of the deployed AI algorithm;
calculating, by the device, a second set of statistical metrics based on the second set of data fields, the second set of statistical metrics characterizing trends or distributions of input data associated with the deployed AI algorithm;
illustrating, by the device, the first set of statistical metrics and the second set of statistical metrics on an electronic display;
detecting, by the device, irregularities in the first set of statistical metrics or in the second set of statistical metrics, based on the first set of statistical metrics or the second set of statistical metrics being above or below predefined thresholds; and
generating, by the device, an alert that identifies detected anomalies.

9. The computer-implemented method of claim 8, further comprising:
comparing, by the device, the second set of statistical metrics characterizing trends or distributions of input data associated with the deployed AI algorithm with baseline statistical metrics characterizing trends or distributions of training data associated with the deployed AI algorithm; and
generating, by the device, an alert based on the comparison, wherein the alert indicates that additional training of the deployed AI algorithm is recommended.

10. The computer-implemented method of claim 8, wherein the first set of statistical metrics are calculated based on feedback associated with the first set of data fields generated as output by the deployed AI algorithm.

11. The computer-implemented method of claim 8, wherein the monitoring information indicates the first set of statistical metrics and the second set of statistical metrics as metrics to be computed.

12. The computer-implemented method of claim 8, wherein the first set of statistical metrics include precision values, recall values, or Dice scores associated with the first set of data fields generated as output by the deployed AI algorithm.

13. The computer-implemented method of claim 8, wherein the second set of statistical metrics include means, standard deviations, minimums, maximums, or cardinalities associated with the second set of data fields collected as input by the deployed AI algorithm.

14. A computer readable medium embodying a computer program product for facilitating real-time monitoring of a deployed machine learning model, the computer program product having program instructions executable by a processor to cause the processor to:
retrieve output datasets generated by the deployed machine learning model and input datasets received by the deployed machine learning model;

calculate first statistical metrics based on the output datasets that quantify performance of the deployed machine learning model;

calculate second statistical metrics based on the input datasets that quantify trends or distributions of input data encountered by the deployed machine learning model;

log the first statistical metrics and the second statistical metrics in a database;

determine whether the first statistical metrics or the second statistical metrics are outside of predefined value ranges; and transmit a warning based on determining that the first statistical metrics or the second statistical metrics are outside of the predefined value ranges.

15. The computer readable medium of claim 14, wherein the program instructions are further executable to cause the processor to: visually display the first statistical metrics and the second statistical metrics on an electronic interface.

16. The computer readable medium of claim 15, wherein the program instructions are further executable to cause the processor to:

generate a receiver operating characteristic (ROC) curve based on the output datasets and based on feedback associated with the output datasets, and visually display the ROC curve on the electronic interface.

17. The computer readable medium of claim 14, wherein the program instructions are further executable to cause the processor to:

compare the second statistical metrics that quantify trends or distributions of input data encountered by the deployed machine learning model with baseline statistical metrics quantifying trends or distributions of training data associated with the deployed machine learning model; and transmit an alert based on the comparison, wherein the alert indicates that additional training of the deployed machine learning model is recommended.

* * * * *